United States Patent
Thoziyoor et al.

(10) Patent No.: US 11,893,240 B2
(45) Date of Patent: Feb. 6, 2024

(54) REDUCING LATENCY IN PSEUDO CHANNEL BASED MEMORY SYSTEMS

(71) Applicant: QUALCOMM Incorporated, San Diego, CA (US)

(72) Inventors: Shyamkumar Thoziyoor, San Diego, CA (US); Pankaj Deshmukh, San Diego, CA (US); Jungwon Suh, San Diego, CA (US); Subbarao Palacharla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/452,606

(22) Filed: Oct. 28, 2021

(65) Prior Publication Data
US 2023/0136996 A1 May 4, 2023

(51) Int. Cl.
*G06F 12/00* (2006.01)
*G06F 3/06* (2006.01)

(52) U.S. Cl.
CPC .......... *G06F 3/0611* (2013.01); *G06F 3/0635* (2013.01); *G06F 3/0679* (2013.01)

(58) Field of Classification Search
CPC ..... G06F 3/0611; G06F 3/0635; G06F 3/0679
See application file for complete search history.

(56) References Cited

U.S. PATENT DOCUMENTS

| 9,343,438 | B1 | 5/2016 | Lee | |
| 2003/0217244 | A1* | 11/2003 | Kelly | G06F 13/1684 711/168 |
| 2011/0085367 | A1 | 4/2011 | Feldman et al. | |
| 2015/0089112 | A1* | 3/2015 | Lo | G06F 13/4018 710/307 |
| 2019/0042500 | A1* | 2/2019 | Agarwal | G06F 13/28 |

(Continued)

OTHER PUBLICATIONS

The history and future of DRAM architectures in different application domains, Timon Evenblij, Gouri Sankar Kar, (Year: 2020).*

(Continued)

*Primary Examiner* — David Yi
*Assistant Examiner* — Tahilba O Puche
(74) *Attorney, Agent, or Firm* — The Marbury Law Group/Qualcomm

(57) ABSTRACT

Various embodiments include methods and devices for reducing latency in pseudo channel based memory systems. Embodiments may include a first pseudo channel selection device configured to selectively communicatively connect one of a plurality of pseudo channels to a first input/output (IO), and a second pseudo channel selection device configured to selectively communicatively connect one of the plurality of pseudo channels to a second IO, in which the first pseudo channel selection device and the second pseudo channel selection device may be operable to communicatively connect a first pseudo channel of the plurality of pseudo channels to the first IO and to the second IO concurrently. Embodiments may include the pseudo channel based memory system configured to receive a memory access command targeting the first pseudo channel, and use a first pseudo channel data bus and a second pseudo channel data bus to implement the memory access command.

26 Claims, 20 Drawing Sheets

(56) References Cited

U.S. PATENT DOCUMENTS

| | | |
|---|---|---|
| 2019/0043552 A1 | 2/2019 | Alameer et al. |
| 2020/0194090 A1 | 6/2020 | Royer et al. |
| 2020/0272567 A1 | 8/2020 | Gans |
| 2021/0166740 A1 | 6/2021 | Shin et al. |
| 2021/0225827 A1 | 7/2021 | Lanka et al. |

OTHER PUBLICATIONS

DDR5 Memory Spec Doubles Data Rate, Quadruples Density—by Tiffany Trader—HPC Wire—(Year: 2020).*
International Search Report and Written Opinion—PCT/US2022/045561—ISA/EPO—dated Jan. 23, 2023 11 pages.

\* cited by examiner

REDUCING LATENCY IN PSEUDO CHANNEL BASED MEMORY SYSTEMS

BACKGROUND

The next generation of double data rate random access memory (referred to herein as "DDR") will be used widely for mobile devices because it can offer a balance of high performance, low power, competitive memory cost, various package types, and multi-sourcing availability that are attractive for mobile and non-mobile applications. However, proposed or existing DDR systems are based on high performance, low latency, and lower power schemes that use data communication protocols that exhibit greater latency, which limits the usage and efficiency of these systems to levels below what is acceptable for many uses, such as vehicle safety-related systems. For example, proposed low power DDR ("LPDDR") systems may utilize approaches that result in degraded latencies for certain operating points when compared with previous generation.

SUMMARY

Various disclosed aspects include apparatuses and methods of reducing latency in pseudo channel based memory systems. Various aspects may include a pseudo channel based memory system, including a first pseudo channel selection device configured to selectively communicatively connect one of a plurality of pseudo channels to a first input/output (IO), and a second pseudo channel selection device configured to selectively communicatively connect one of the plurality of pseudo channels to a second IO, in which the first pseudo channel selection device and the second pseudo channel selection device are operable to communicatively connect a first pseudo channel of the plurality of pseudo channels to the first IO and to the second IO concurrently in a first operation mode.

In some aspects, the first IO may include a first pseudo channel data bus and the second IO may include a second pseudo channel data bus, and the pseudo channel based memory system may further include a first internal data bus having a larger bit width than the first pseudo channel data bus and communicatively connected to the first pseudo channel, a second internal data bus having a same bit width as the first pseudo channel data bus and communicatively connected between a first portion of the first internal data bus and the first pseudo channel selection device, and a third internal data bus having a same bit width as the second pseudo channel data bus and communicatively connected between a second portion of the first internal data bus and the second pseudo channel selection device.

In some aspects, the first internal data bus may have a bit width equal to an integer multiple of the first pseudo channel data bus.

Some aspects may further include a fourth internal data bus having a larger bit width than the first pseudo channel data bus and communicatively connected to a second pseudo channel of the plurality of pseudo channels, a fifth internal data bus having a same bit width as the first pseudo channel data bus and communicatively connected between a first portion of the fourth internal data bus and the first pseudo channel selection device, and a sixth internal data bus having a same bit width as the second pseudo channel data bus and communicatively connected between a second portion of the fourth internal data bus and the second pseudo channel selection device.

In some aspects, the first pseudo channel selection device and the second pseudo channel selection device may be operable to communicatively connect the first pseudo channel to the first IO and to the second IO concurrently in response to the pseudo channel based memory system receiving a low latency type memory access command targeting the first pseudo channel.

Some aspects may further include a memory control device configured to receive the low latency type memory access command targeting the first pseudo channel, and transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the low latency type memory access command.

In some aspects, the first pseudo channel selection device and the second pseudo channel selection device may be operable to communicatively connect the first pseudo channel to the first IO and to the second IO concurrently in response to the pseudo channel based memory system receiving a mode register write command configured to cause the pseudo channel based memory system to handle a successive memory access command as a low latency type memory access command and in response to the pseudo channel based memory system receiving a successive memory access command targeting the first pseudo channel.

Some aspects may further include a memory control device configured to receive the mode register write command, set a register value configured to cause the memory control device to handle the successive memory access command as a low latency type memory access command in response to receiving the mode register write command, receive the successive memory access command targeting the first pseudo channel, and transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response receiving the successive memory access command.

In some aspects, the first pseudo channel selection device and the second pseudo channel selection device each may include at least one multiplexer.

In some aspects, the first pseudo channel selection device is operable to communicatively connect the first pseudo channel to the first IO, and the second pseudo channel selection device is operable to communicatively connect a second pseudo channel of the plurality of pseudo channels to the second IO in a second operation mode.

Various aspects may include a pseudo channel based memory system, including a plurality of pseudo channels, including a first pseudo channel, in which the pseudo channel based memory system is configured to receive a memory access command targeting the first pseudo channel, and use a first pseudo channel data bus and a second pseudo channel data bus to implement the memory access command.

In some aspects, the memory access command may be a read memory access command, and the pseudo channel based memory system may be configured such that using the first pseudo channel data bus and the second pseudo channel data bus to implement the memory access command includes outputting data from the first pseudo channel in response to the read memory access command via the first pseudo channel data bus and the second pseudo channel data bus concurrently.

In some aspects, the memory access command may be a write memory access command, and the pseudo channel based memory system may be configured such that using the first pseudo channel data bus and the second pseudo channel data bus to implement the memory access command includes receiving data of the write memory access command for the first pseudo channel via the first pseudo channel data bus and the second pseudo channel data bus concurrently.

In some aspects, the memory access command may be configured to indicate to the pseudo channel based memory system that the memory access command is a low latency type memory access command.

In some aspects, the pseudo channel based memory system may be further configured to receive a mode register write command configured to cause the pseudo channel based memory system to handle a successive memory access command as a low latency type memory access command, in which the memory access command targeting the first pseudo channel may be a successive memory access command to the mode register write command.

Further aspects include methods executing operations of the systems summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
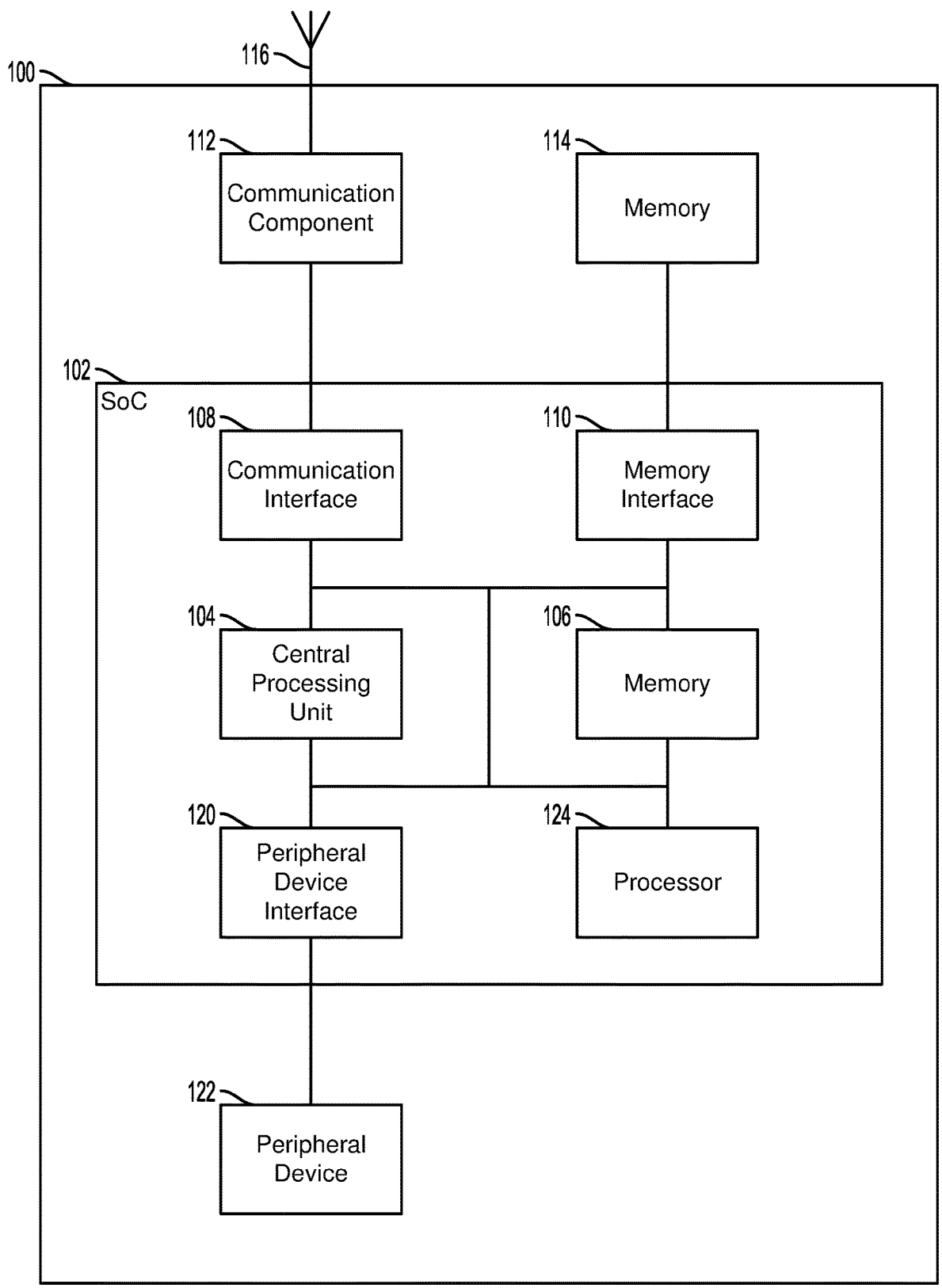
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of reducing latency in pseudo channel based memory systems. Pseudo channel selection devices may be employed in a pseudo channel based memory system. Multiple pseudo channels may be communicatively connected to the pseudo channel selection devices via internal data busses wider than a dedicated input/output (IO) data bus of a pseudo channel. The pseudo channel selection devices may be configured to enable the pseudo channel based memory system to read data from and/or write data to a pseudo channel using multiple IOs of multiple pseudo channels in parallel.

The term "computing device" may refer to stationary computing devices including personal computers, desktop computers, all-in-one computers, workstations, super computers, mainframe computers, embedded computers (such as in vehicles and other larger systems), computerized vehicles (e.g., partially or fully autonomous terrestrial, aerial, and/or aquatic vehicles, such as passenger vehicles, commercial vehicles, recreational vehicles, military vehicles, drones, etc.), servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

The next generation of double data rate random access memory (referred to herein as "DDR") can offer a balance of high performance, low power, competitive memory cost, various package types, and/or multi-sourcing availability that are attractive for mobile and non-mobile applications. Existing DDR systems support a pseudo channel mode for which multiple pseudo channels are implemented per channel of a DDR system. However, proposed or existing DDR systems are based on high performance, low latency, and/or lower power schemes that use data communication protocols that can exhibit high latency. Such latency limits the usage and efficiency of these systems to levels below what is acceptable for many uses.

Proposed or existing DDR systems support a pseudo channel mode for which multiple pseudo channels are implemented per channel of a DDR system. Each pseudo channel may have dedicated banks and a dedicated data bus, and share a command and address bus with at least one other pseudo channel or have a dedicated command and address bus. IO of the pseudo channel may be managed by a combination of IO schemes, specifically pulse amplitude modulation (PAM) (e.g., PAM4), which delivers multiple bytes of data per (e.g., 2 bytes) write/read via PAM coding, and non-return to zero (NRZ) coding, which delivers one byte of data per write/read cycle. PAM coding may be used for clock frequencies greater than 1600 MHz, while NRZ coding may be used for clock frequencies less than or equal to 1600 MHz. IO signaling based on PAM coding has worsening IO power efficiency as its operating frequency declines because PAM transmitters consume DC current when driving PAM multi-level signals. However, NRZ transmitters do not consume as much DC current and NRZ signal interfaces are better suited for low frequencies in power efficiency sensitive systems, such as mobile phones. As a result, the two different IO schemes require dynamic burst lengths during write/read operations to achieve the same data transmission. These differences in write/read burst lengths result in differences in latency between the different IO schemes. The net results are that below certain clock frequencies (e.g., 1600 MHz) when NRZ coding is used, the transfer of data to or from memory banks takes longer, increasing latency, which may not be acceptable in some applications.

Embodiments described herein address the forgoing issues of DDR systems, reducing the latency for read and/or write operations at a DDR system by employing one or more pseudo channel selection devices configured to selectively communicatively connect at least one selected pseudo channel of multiple pseudo channels of the DDR system to an IO data bus shared by at least two of the multiple pseudo channels. Embodiments described herein may be applied in any DDR system, such as DDR, LPDDR, GDDR, WideIO, etc. For example, implementation of the one or more pseudo channel selection devices may reduce latency when the DDR is operated at low frequencies (e.g., ≤1600 MHz) when the NRZ coding IO scheme is implemented by using two (or more) data buses (e.g., 16 bit data bus) concurrently to transfer data (e.g., 32 bits, 64 bits, etc.). As another example, implementation of the one or more pseudo channel selection devices may reduce latency when the DDR is operated at high frequencies (e.g., >1600 MHz) and the PAM coding IO scheme is implemented by using two (or more) data buses (e.g., 16 bit data bus) concurrently to transfer data (e.g., 32 bits, 64 bits, etc.).

Various embodiments include an adaptive IO scheme for pseudo channels in a DDR system that reduces latency for memory access transactions compared to proposed or existing DDR systems. The DDR system may include one or more pseudo channel selection devices, such as multiplexers configured with multiplexing and demultiplexing capabilities, integrated on a DDR chip. Each pseudo channel selection device may enable two (or more) pseudo channels to share dedicated data buses of DDR systems. In some examples, a larger pseudo channel selection device may include multiple smaller pseudo channel selection devices.

In one implantation described in detail below with reference to FIGS. 3A and 4A-4C, each of two or more pseudo channel selection device may be connected to a respective dedicated data bus (e.g., a 16 bit bus) of a DDR system and may enable the two (or more) pseudo channels to share the dedicated data bus. By providing two (or more) pseudo channel selection devices and connecting the pseudo channel selection devices to the two (or more) pseudo channels, the two (or more) pseudo channels may access to a combined data bus (e.g., a 32 bit bus). The combined data bus may include the dedicated data buses connected to the two or more pseudo channel selection devices and, therefore, have a greater width (e.g., twice) than the individual dedicated data buses. In other words, the width of the combined data bus, in terms of bits, may be a multiple greater than "1" of the width of a dedicated data bus connected to each memory bank. Each pseudo channel may be communicatively connected to the two (or more) pseudo channel selection devices by an internal data bus. The bit width of the internal data bus at the pseudo channel may be of the same width as the combined data bus, and the bit width of the internal data bus at each pseudo channel selection device may be a fraction of the bit width of the internal data bus, such as half or smaller. For example, each internal data bus may be a 32 bit internal data bus at the pseudo channel and a 16 bit or smaller internal data bus at each of the two or (more) pseudo channel selection devices. The two (or more) pseudo channel selection devices may selectively connect a selected pseudo channel to the combined data bus, via the respective internal data bus. The two (or more) pseudo channel selection devices may be mn:m multiplexers, where "m" and "n" are integers greater than "1", such as an integer "m" equal to a width of a dedicated data bus, and an integer "n" equal to a number of pseudo channels communicatively connected to the respective pseudo channel selection device. For example, the pseudo channel selection device may be a 16n:16 multiplexer. As another example, for two pseudo channels, the pseudo channel selection device may be a 32:16 multiplexer.

In another implementation described in detail below with reference to FIGS. 3B and 4A-4C, a pseudo channel selection device may be connected to two (or more) dedicated data buses (e.g., 16 bit buses) of a DDR system and may enable the two (or more) pseudo channels to share the dedicated data buses. By providing the pseudo channel selection device and connecting the pseudo channel selection device to the two (or more) pseudo channels, the two (or more) pseudo channels may have access to a combined data bus (e.g., a 32 bit bus). The combined data bus may include the dedicated data buses connected to the pseudo channel selection device and, therefore, have a greater width (e.g., twice) than the individual dedicated data buses. In other words, the width of the combined data bus, in terms of bits, may be a multiple greater than "1" of the width of a dedicated data bus connected to each memory bank. Each pseudo channel may be communicatively connected to the pseudo channel selection device by an internal data bus. The bit width of the internal data bus may be of the same width as the combined data bus. For example, each internal data bus may be a 32 bit internal data bus. The pseudo channel selection device may selectively connect a selected pseudo channel to the combined data bus, via the respective internal data bus. The pseudo channel selection device may be an pn:p multiplexer, where "p" and "n" are integers greater than "1", such as an integer "p" equal to a width of the combined data bus, and an integer "n" equal to a number of pseudo channels communicatively connected to the pseudo channel selection device. For example, the pseudo channel selection device may be a 32n:32 multiplexer. As another example, for two pseudo channels, the pseudo channel selection device may be a 64:32 multiplexer. The pseudo channel selection device may further include multiple smaller pseudo channel selection devices configured in a similar manner as the two (or more) pseudo channel selection devices described above.

The DDR system may be configured with any number of pseudo channels per DDR chip, such as at least 2 pseudo channels. For example, a DDR chip may include 2 pseudo channels, 3 pseudo channels, 4 pseudo channels, 6 pseudo channels, 8 pseudo channels, etc. The one or more pseudo channel selection devices may be configured to select at least one of the pseudo channels of the DDR chip. The DDR chip may include multiple pseudo channel selection devices communicatively connected in parallel to the combined data bus. The multiple pseudo channel selection devices may be configured to function together as a larger pseudo channel selection device, as described above, such that selection of which pseudo channel to selectively communicatively connect to the combined data bus may be controlled through the multiple pseudo channel selection devices.

The DDR system using the one or more pseudo channel selection devices selecting at least one of the pseudo channels for a memory access transaction reduces latency, particularly in comparison to an NRZ coding IO scheme of existing DDR systems, by enabling use of the width of the combined data bus for each connected pseudo channel. The burst length to transmit the data over the greater width combined data bus is reduced in comparison to the lower width dedicated data bus by doubling (or more) the number of bits transmitted using NRZ in one write or read operation. As a result of the greater width combined data bus and reduced burst length, the latency of data transmissions is reduced compared to conventional DDR systems.

FIG. 1 illustrates a system including a computing device 100 suitable for use with various embodiments. The computing device 100 may include a system-on-chip (SoC) 102 with a central processing unit 104, a memory 106, a communication interface 108, a memory interface 110, a peripheral device interface 120, and a processing device 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors and/or processor cores, such as a central processing unit (CPU) 104, and/or processor 124, including a general purpose processor, a central processing unit (CPU) 104, a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more CPUs 104 and processors 124. The computing device 100 may include more than one SoC 102, thereby increasing the number of CPUs 104, processors 124, and processor cores. The computing device 100 may also include CPUs 104 and processors 124 that are not associated with an SoC 102. Individual CPUs 104 and processors 124 may be multicore processors. The CPUs 104 and processors 124 may each be configured for specific purposes that may be the same as or different from other CPUs 104 and processors 124 of the computing device 100. One or more of the CPUs 104, processors 124, and processor cores of the same or different configurations may be grouped together. A group of CPUs 104, processors 124, or processor cores may be referred to as a multiprocessor cluster.

The memory 106 of the SoC 102 may be a volatile or non-volatile memory configured for storing data and processor-executable code for access by the CPU 104, the processor 124, or other components of SoC 102. The computing device 100 and/or SoC 102 may include one or more memories 106 configured for various purposes. One or more memories 106 may include volatile memories such as random-access memory (RAM), including DDR, implemented as main memory or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the CPU 104 and/or processor 124 and temporarily stored for future quick access without being stored in non-volatile memory. The memory 106 may be configured to store data and processor-executable code, at least temporarily, that is loaded to the memory 106 from another memory device, such as another memory 106 or memory 114, for access by one or more of the CPU 104, the processor 124, or other components of SoC 102. In some embodiments, any number and combination of memories 106 may include one-time programmable or read-only memory.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106, such as main memory, in which the memory 114 may store the data or processor-executable code for access by one or more of the CPU 104, the processor 124, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the CPU 104, the processor 124, or other components of the SoC 102 to read data from and write data to the memory 114.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
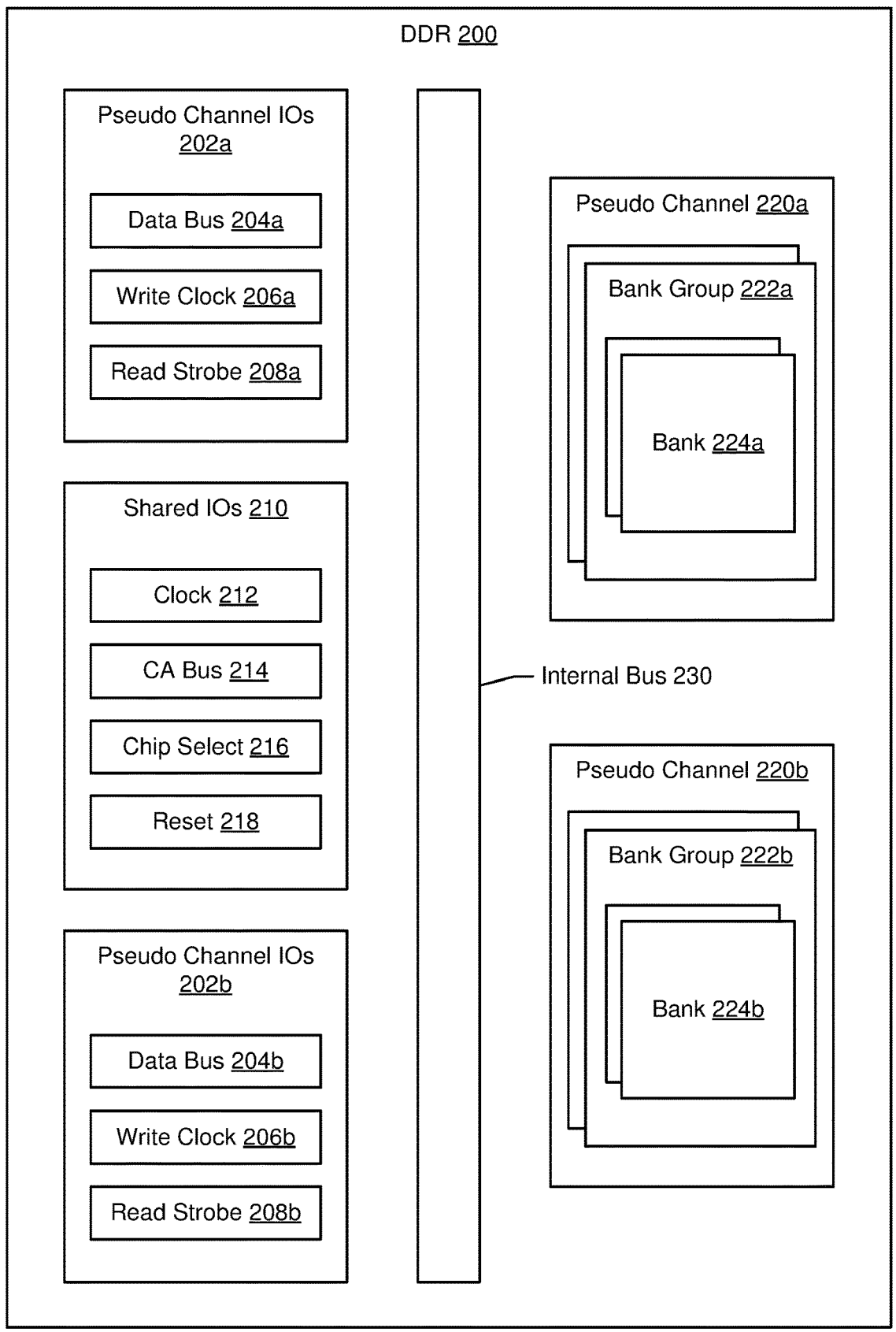
FIG. 2 is a component block diagram illustrating an example pseudo channel based memory system suitable for implementing various embodiments.

FIG. 2 illustrates an example pseudo channel based memory system (e.g., memory 106, memory 114 in FIG. 1) suitable for implementing various embodiments. With reference to FIGS. 1 and 2, the example pseudo channel based memory system may include any number of DDR chips 200. Each DDR chip 200, may include any number of banks 224a, 224b. For example, a DDR chip 200 may include 32 banks. The banks 224a, 224b may be arranged in any number and combination to form any number of bank groups 222a, 222b. For example, the DDR chip 200 may include 16 bank groups 222a, 222b, and each bank group 222a, 222b may include 2 banks 224a, 224b; bank group 222a including 2 banks 224a and bank group 222b including 2 banks 224b. The banks 224a, 224b and bank groups 222a, 222b may be arranged in any number and combination to form at least two pseudo channels 220a, 220b. In other words, each pseudo channel 220a, 220b may include one or more bank groups 222a, 222b, and each bank group 222a, 222b may include one or more banks 224a, 224b. Different bank groups 222a, 222b of a pseudo channel 220a, 220b may include a same number of banks 224a, 224b or a different number of banks 224a, 224b. Different pseudo channels 220a, 220b may include a same number of bank groups 222a, 222b or a different number of bank groups 222a, 222b. For example, the DDR chip 200 may include 2 pseudo channels 220a, 220b, each pseudo channel 220a, 220b may include 8 bank groups 222a, 222b, and each bank group 222a, 222b may include 2 banks 224a, 224b. More specifically, pseudo channel 220a may include 8 bank groups 222a, each bank group 222a may include 2 banks 224a, pseudo channel 220b may include 8 bank groups 222b, and each bank group 222b may include 2 banks 224b.

The pseudo channels 220a, 220b, including the banks 224a, 224b, may be communicatively connected to pseudo channel IOs 202a, 202b and shared IOs 210 via an internal bus 230. For example, each pseudo channel 220a, 220b may be communicatively connected to a dedicated one of the pseudo channel IOs 202a, 202b and at least two pseudo channels 220a, 220b may be communicatively connected to a shared IO 210. As such, the DDR chip 200 may include the same number of pseudo channels 220a, 220b and pseudo channel IOs 202a, 202b.

Each pseudo channel IO 202a, 202b may include a data bus 204a, 204b, respectively. Each pseudo channel IO 202a, 202b may be configured to enable the DDR chip 200 to receive data from a host (e.g., CPU 104, processor 124 in FIG. 1) and transmit the data to the pseudo channel 220a, 220b via the communicatively connected data bus 204a, 204b. Further, each pseudo channel IO 202a, 202b may be configured to enable the DDR chip 200 to receive data from the pseudo channel 220a, 220b and transmit the data to the host via the communicatively connected data bus 204a, 204b. The data buses 204a, 204b may be portions of a larger data bus than the data buses 204a, 204b dedicated for the communicatively connected pseudo channels IO 202a, 202b. Each pseudo channel IO 202a, 202b may further include a write clock 206a, 206b and a read strobe 208a, 208b configured to provide signals for operation of the pseudo channel 220a, 220b communicatively connected to the pseudo channel IO 202a, 202b.

Each shared IO 210 may include a command address (CA) bus 214. The CA bus 214 may be configured to enable the DDR chip 200 to implement memory access commands, such as reads and/or writes, at specified addresses within the pseudo channel 220a, 220b communicatively connected to a shared IO 210. Each shared IO 210 may further include a clock 212, a chip select 216, and a reset 218 configured to provide signals for operation of the pseudo channel 220a, 220b communicatively connected to the shared IO 210.

Conventionally, each pseudo channel 220a, 220b may be communicatively connected only to the respective dedicated one of the pseudo channel IOs 202a, 202b and not to other pseudo channel IOs 202a, 202b. For example, the pseudo channel 220a may be communicatively connected only to the pseudo channel IO 202a and the pseudo channel 220b may be communicatively connected only to the pseudo channel IO 202b. In particular, the pseudo channel 220a may be communicatively connected only to the data bus 204a of the pseudo channel IO 202a and the pseudo channel 220b may be communicatively connected only to the data bus 204b of the pseudo channel IO 202b. In embodiments provided herein, each pseudo channel 220a, 220b may be communicatively connected to multiple pseudo channel IOs 202a, 202b. For example, the pseudo channel 220a may be communicatively connected to the pseudo channel IOs 202a, 202b and the pseudo channel 220b may be communicatively connected to the pseudo channel IOs 202a, 202b. In particular, the pseudo channel 220a may be communicatively connected to the data bus 204a of the pseudo channel IO 202a and the data bus 204b of the pseudo channel IO 202b, and the pseudo channel 220b may be connected to the data bus 204a of the pseudo channel IO 202a and the data bus 204b of the pseudo channel IO 202b. These communicative connections of the pseudo channels 220a, 220b to multiple data buses 204a, 204b may provide the pseudo channel 220a, 220b access to a larger portion of the larger data bus than the conventional connections of the pseudo channels 220a, 220b only to dedicated ones of the data buses 204a, 204b. For example, the connections of the pseudo channels 220a, 220b to multiple data buses 204a, 204b may provide the pseudo channel 220a, 220b access to a portion of the larger data bus of a size of the data buses 204a, 204b combined. The conventional connections of the pseudo channels 220a, 220b only to dedicated ones of the data buses 204a, 204b provides the pseudo channel 220a, 220b access to a portion of the larger data bus of a size of an individual data bus 204a, 204b.

Figure 3A:
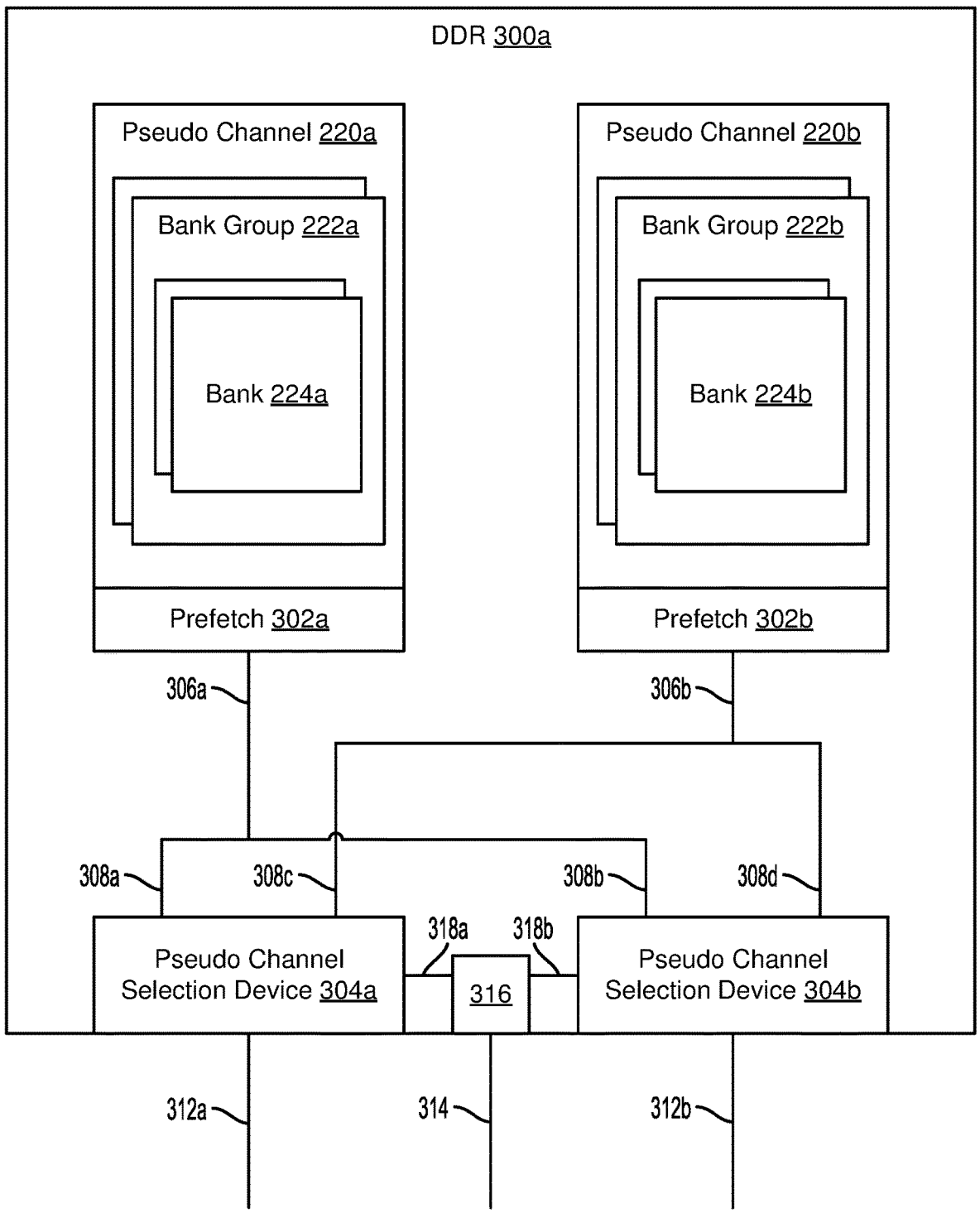
FIGS. 3A and 3B are component block diagrams illustrating example pseudo channel based memory systems suitable for implementing various embodiments.
Figure 3B:
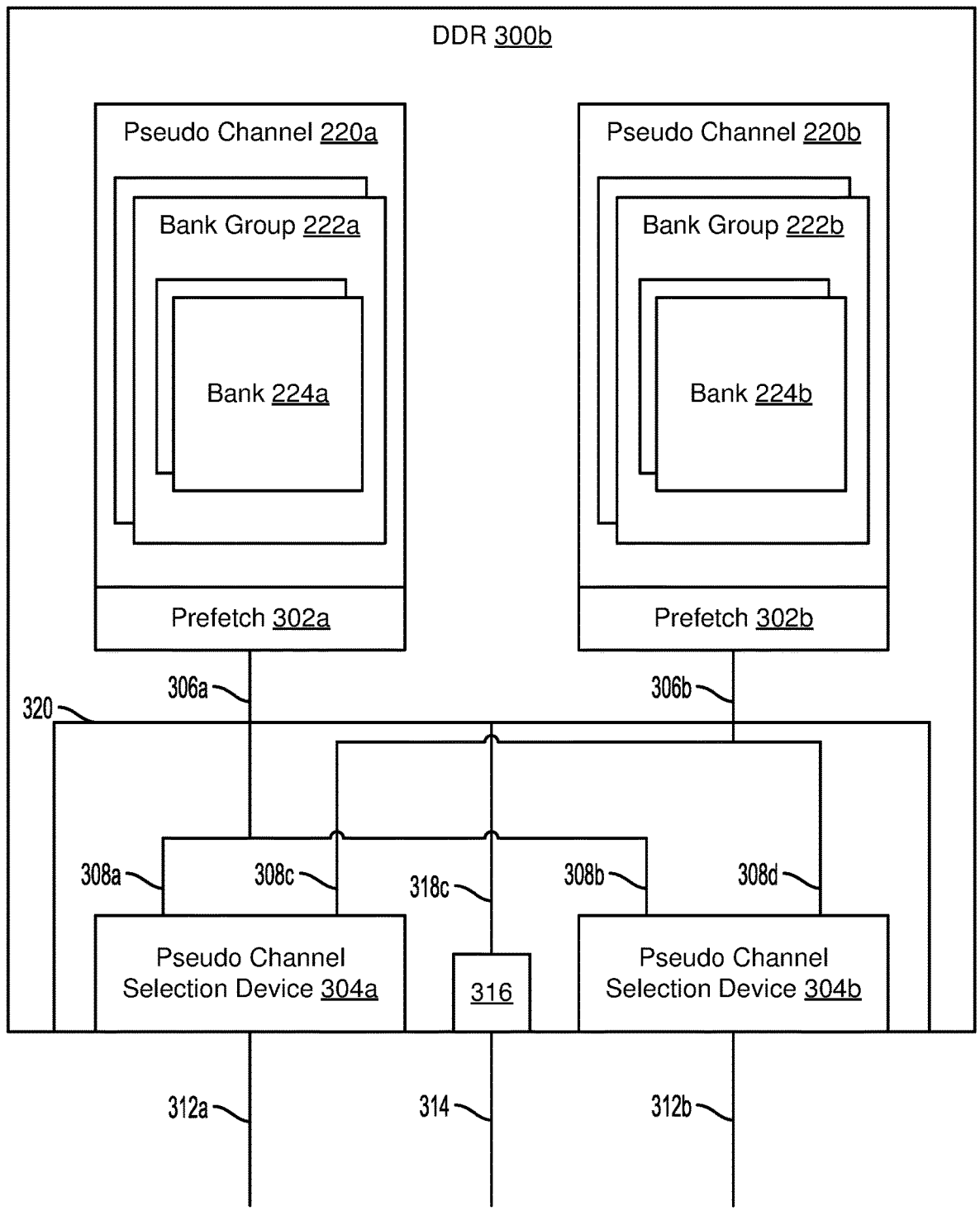

FIGS. 3A and 3B illustrate example pseudo channel based memory systems (e.g., memory 106, memory 114 in FIG. 1) suitable for implementing various embodiments. With reference to FIGS. 1-3B, the example pseudo channel based memory system may include any number of DDR chips 300a, 300b (e.g., DDR chip 200 in FIG. 2). A DDR chip 300a, 300b may include any number and combination of banks 224a, 224b, bank groups 222a, 222b, and pseudo channels 220a, 220b. For ease of explanation and clarity, examples presented herein are based on 2 pseudo channels. However, such examples are not meant to limit the scope of the claims or descriptions, and the examples presented herein may similarly apply to a DDR chip including 2 pseudo channels, 3 pseudo channels, 4 pseudo channels, 6 pseudo channels, 8 pseudo channels, $2^x$ pseudo channels for which "x" is an integer greater than "0", etc.

The DDR chip 300a, 300b may further include prefetch memories 302a, 302b associated with each pseudo channel 220a, 220b. The prefetch memories 302a, 302b may be configured to hold data retrieved from the banks 224a, 224b of the associated pseudo channel 220a, 220b. The prefetch memories 302a, 302b may generally have smaller capacities in comparison to the banks 224a, 224b. In some examples, the prefetch memories 302a, 302b may have capacities equal to a bit width of an internal data bus 306a, 306b, described further herein. For example, the prefetch memories 302a, 302b may be an array of registers having a combined capacity of 256 bits.

In the example illustrated in FIG. 3A, the DDR chip 300a may further include pseudo channel selection devices 304a, 304b. For example, the pseudo channel selection devices 304a, 304b may be any number and combination of multiplexers. Each pseudo channel selection device 304a, 304b may be communicatively connected to a pseudo channel data bus 312a, 312b (e.g., data bus 204a, 204b in FIG. 2). Each pseudo channel selection device 304a, 304b may also be communicatively connected to at least two pseudo channels 220a, 220b. The pseudo channel selection devices 304a, 304b may be communicatively connected to the pseudo channels 220a, 220b via internal data buses 306a, 306b, 308a, 308b, 308c, 308d. For example, the internal data buses 306a and 308a may communicatively connect the pseudo channel selection device 304a and the pseudo channel 220a, and the internal data buses 306a and 308b may communicatively connect the pseudo channel selection device 304b and the pseudo channel 220a. Further, the internal data buses 306b and 308c may communicatively connect the pseudo channel selection device 304a and the pseudo channel 220b, and the internal data buses 306b and 308d may communicatively connect the pseudo channel selection device 304b and the pseudo channel 220b. The pseudo channel selection device 304a, 304b may be configured to communicatively connect the pseudo channels 220a, 220b to multiple pseudo channel data buses 312a, 312b via the internal data buses 306a, 306b, 308a, 308b, 308c, 308d, as described further herein. The internal data buses 306a, 306b may be sized to have the same bit width of at least two pseudo channel data buses 312a, 312b to which the internal data buses 306a, 306b may be communicatively connected. For example, the internal data buses 306a, 306b may each have a 32 bit width and the pseudo channel data buses 312a, 312b may each have a 16 bit width. The internal data buses 308a, 308b, 308c, 308d may be sized to have the same bit width of the pseudo channel data buses 312a, 312b to which the internal data buses 308a, 308b, 308c, 308d may be communicatively connected. For example, the internal data buses 308a, 308b, 308c, 308d may each have a 16 bit width and the pseudo channel data buses 312a, 312b may each have a 16 bit width.

As another example, dedicated internal data buses (not shown) may communicatively connect a pseudo channel 220a, 220b with respective pseudo channel selection devices 304a, 304b. The dedicated internal data buses may be sized to have the same bit width as the pseudo channel data buses 312a, 312b to which the dedicated internal data buses may be communicatively connected. For example, the dedicated internal data buses may each have a 16 bit width and the pseudo channel data buses 312a, 312b may each have a 16 bit width. The prefetch memories 302a, 302b may have capacities equal to a combined bit width of the respective dedicated internal data buses or separate prefetch memories may be provided for each dedicated internal data bus.

The DDR chip 300a may include a pseudo channel controller 316 that may be communicatively connected to a CA bus 314 (e.g., CA bus 214 in FIG. 2) and to the pseudo channel selection devices 304a, 304b via pseudo channel selection signal lines 318a, 318b. The pseudo channel controller 316 may be configured to receive memory access commands via the CA bus 314. The pseudo channel controller 316 may be configured to interpret the memory access commands to determine whether to provide a pseudo channel selection signal (including by asserting or deasserting a pseudo channel selection signal) to the pseudo channel selection devices 304a, 304b via the pseudo channel selection signal lines 318a, 318b. The pseudo channel controller 316 may receive a memory access command configured to indicate that a memory access is a low latency type memory access. For example, the memory access command may include an indication, such as a value in a field, of a low latency type memory access. As another example, a mode register write may precede a memory access command and be configured to set a register value to indicate to the pseudo channel controller 316 that any following memory access commands are to be implemented as low latency type memory accesses. The pseudo channel controller 316 may also determine the pseudo channel 220a, 220b for which the low latency type memory access is targeted and issue a pseudo channel selection signal to the pseudo channel selection devices 304a, 304b. The pseudo channel selection signal may prompt the pseudo channel selection devices 304a, 304b to configure to communicatively connect the pseudo channel 220a, 220b targeted for the memory access to the pseudo channel data buses 312a, 312b via the internal data buses 306a, 306b, 308a, 308b, 308c, 308d. In some examples, the pseudo channel selection signals to the pseudo channel selection devices 304a, 304b may be the same pseudo channel selection signals. In some examples, the pseudo channel selection signals to the pseudo channel selection devices 304a, 304b may be different pseudo channel selection signals. In any of the foregoing examples, the DDR chip 300a and/or components thereof, including the pseudo channel selection devices 304a, 304b and the pseudo channel controller 316, may operate in a first operation mode for implementing a low latency type memory access, whether the memory access command is configured to indicate that a memory access is a low latency type memory access or the memory access command follows the mode register write.

Similarly, the pseudo channel controller 316 may receive a memory access command configured to indicate that a memory access is a standard or non-low latency type memory access. For example, the memory access command may include an indication, such as a value in a field, of a standard or non-low latency type memory access. As another example, a memory access command may not follow a mode register write configured to set a register value to indicate to the pseudo channel controller 316 that any following memory access commands are to be implemented as low latency type memory accesses. Further, a memory access command may follow a mode register write configured to set a register value to indicate to the pseudo channel controller 316 that any following memory access commands are to be implemented as standard or non-low latency type memory accesses.

The pseudo channel controller 316 may also determine the pseudo channel 220a, 220b for which the standard or non-low latency type memory access is targeted and issue a pseudo channel selection signal to the pseudo channel selection devices 304a, 304b. The pseudo channel selection signal may prompt the pseudo channel selection devices 304a, 304b to configure so as to communicatively connect the pseudo channel 220a, 220b targeted for the memory access to a respective pseudo channel data bus 312a, 312b via the internal data buses 306a, 306b, 308a, 308b, 308c, 308d. In some embodiments, the pseudo channel selection signals to the pseudo channel selection devices 304a, 304b may be the same pseudo channel selection signals. In some embodiments, the pseudo channel selection signals to the pseudo channel selection devices 304a, 304b may be different pseudo channel selection signals. In any of these embodiments, the DDR chip 300a and/or components thereof, including the pseudo channel selection devices 304a, 304b and the pseudo channel controller 316, may operate in a second operation mode for implementing a standard or non-low latency type memory access if the memory access command does not follow the mode register write for causing any following memory accesses to be implemented as low latency type memory accesses, or the memory access command follow a mode register write for causing any following memory accesses to be implemented as standard or non-low latency type memory accesses, whether the memory access command is configured to indicate that a memory access is a standard or non-low latency type memory access.

In the example illustrated in FIG. 3B, the DDR chip 300b may further include a pseudo channel selection device 320, which may include a number and combination of pseudo channel selection devices 304a, 304b as described herein with reference to FIG. 3A. The pseudo channel selection device 320 may be communicatively connected to the pseudo channel data buses 312a, 312b (e.g., data bus 204a, 204b in FIG. 2). The pseudo channel selection device 320 may also be communicatively connected to at least two pseudo channels 220a, 220b. The pseudo channel selection device 320 may be communicatively connected to the pseudo channels 220a, 220b via the internal data buses 306a, 306b. The pseudo channel selection device 320 may communicatively connect the internal data buses 306a, 306b, 308a, 308b, 308c, 308d, and the pseudo channel selection devices 304a, 304b may be communicatively connected to the pseudo channels 220a, 220b via the internal data buses 306a, 306b, 308a, 308b, 308c, 308d as described herein with reference to FIG. 3A. As another example, the pseudo channel selection devices 320 may be communicatively connected to the pseudo channels 220a, 220b and the pseudo channel selection devices 304a, 304b via dedicated internal data buses (not shown) as described herein with reference to FIG. 3A.

The DDR chip 300b may include the pseudo channel controller 316 that may be communicatively connected to the CA bus 314 (e.g., CA bus 214 in FIG. 2) as described herein with reference to FIG. 3A, and to the pseudo channel selection device 320 via pseudo channel selection signal line(s) 318c. The pseudo channel controller 316 may be communicatively connected to the pseudo channel selection devices 304a, 304b via the pseudo channel selection device 320. The pseudo channel controller 316 may be configured to receive memory access commands via the CA bus 314. The pseudo channel controller 316 may be configured to interpret the memory access commands to determine whether to provide a pseudo channel selection signal (including by asserting or deasserting a pseudo channel selection signal) to the pseudo channel selection devices 320, 304a, 304b via the pseudo channel selection signal lines 318c. The pseudo channel controller 316 may receive a memory access command configured to indicate that a memory access is a low latency type memory access, and determine the pseudo channel 220a, 220b for which the low latency type memory access is targeted, as described herein with reference to FIG. 3A. The pseudo channel controller 316 may issue a pseudo channel selection signal to the pseudo channel selection device 320, which may transmit the pseudo channel selection signal to the pseudo channel selection devices 304a, 304b. In some embodiments, the pseudo channel selection device 320 may forward the pseudo channel selection signal to one or more of the pseudo channel selection devices 304a, 304b. The pseudo channel selection signal may prompt the pseudo channel selection devices 304a, 304b to configure to communicatively connect the pseudo channel 220a, 220b targeted for the memory access to the pseudo channel data buses 312a, 312b via the internal data buses 306a, 306b, 308a, 308b, 308c, 308d, as described herein with reference to FIG. 3A. In any of the foregoing examples, whether the memory access command is configured to indicate that a memory access is a low latency type memory access or the memory access command follows the mode register write, the DDR chip 300b and/or components thereof, including the pseudo channel selection devices 304a, 304b, 320 and the pseudo channel controller 316, may operate in a first operation mode for implementing a low latency type memory access.

Similarly, the pseudo channel controller 316 may receive a memory access command configured to indicate that a memory access is a standard or non-low latency type memory access, and determine the pseudo channel 220a, 220b for which the standard or non-low latency type memory access is targeted, as described herein with reference to FIG. 3A. The pseudo channel controller 316 may issue a pseudo channel selection signal to the pseudo channel selection device 320, which may transmit the pseudo channel selection signal to the pseudo channel selection devices 304a, 304b. In some embodiments, the pseudo channel selection device 320 may forward the pseudo channel selection signal to one or more of the pseudo channel selection devices 304a, 304b. The pseudo channel selection signal may prompt the pseudo channel selection devices 304a, 304b to configure to communicatively connect the pseudo channel 220a, 220b targeted for the memory access to a respective pseudo channel data bus 312a, 312b via the internal data buses 306a, 306b, 308a, 308b, 308c, 308d, as described herein with reference to FIG. 3A. The DDR chip 300b and/or components thereof, including the pseudo channel selection devices 304a, 304b, 320 and the pseudo channel controller 316, may operate in a second operation mode for implementing a standard or non-low latency type memory access if the memory access command does not follow the mode register write for causing any following memory accesses to be implemented as low latency type memory accesses, or the memory access command follow a mode register write for causing any following memory accesses to be implemented as standard or non-low latency type memory accesses, whether the memory access command is configured to indicate that a memory access is a standard or non-low latency type memory access.

In the examples provided herein, specific values such as numbers, sizes, and/or capacities of components are not meant to limit the scope of the claims and descriptions. The examples presented herein may similarly apply numbers, sizes, and/or capacities of components larger and/or smaller than the example numbers, sizes, and/or capacities provided herein. For example, the prefetch memories 302a, 302b may have capacity of $2^X$ bits greater than or less than 256 bits. As another example, the internal data buses 306a, 306b may have $2^X$ bit width greater than or less than 32 bits. As another example, the pseudo channel data buses 312a, 312b may have $2^X$ bit width greater than or less than 16 bits. As another example, the internal data buses 308a, 308b, 308c, 308d may have $2^X$ bit width greater than or less than 16 bits. For the foregoing examples "X" is an integer greater than "0". As noted herein, the DDR chip 300a, 300b may include more than 2 pseudo channels 220a, 220b. As such, the DDR chip 300a, 300b may include appropriate numbers of pseudo channel selection devices 304a, 304b, 320, internal data buses 306a, 306b, 308a, 308b, 308c, 308d, and pseudo channel selection signal lines 318a, 318b, 318c to implement the embodiments provided herein. For example, the DDR chip 300a, 300b may include one or more duplicates of the pseudo channels 220a, 220b, pseudo channel selection devices 304a, 304b, 320, internal data buses 306a, 306b, 308a, 308b, 308c, 308d, and pseudo channel selection signal lines 318a, 318b, 318c as the example illustrated in FIG. 3. As another example, the DDR chip 300a, 300b may include additional pseudo channels, pseudo channel selection devices, internal data buses, and pseudo channel selection signal lines expanding the examples illustrated in FIGS. 3A and 3B. For example, one or more additional pseudo channels may be communicatively connected to one or more of the pseudo channel selection devices 304a, 304b, 320 and to at least one additional pseudo channel selection device, via additional internal data buses, and additional pseudo channel selection signal lines may be communicatively connected to any additional pseudo channel selection devices.

Figure 4A:
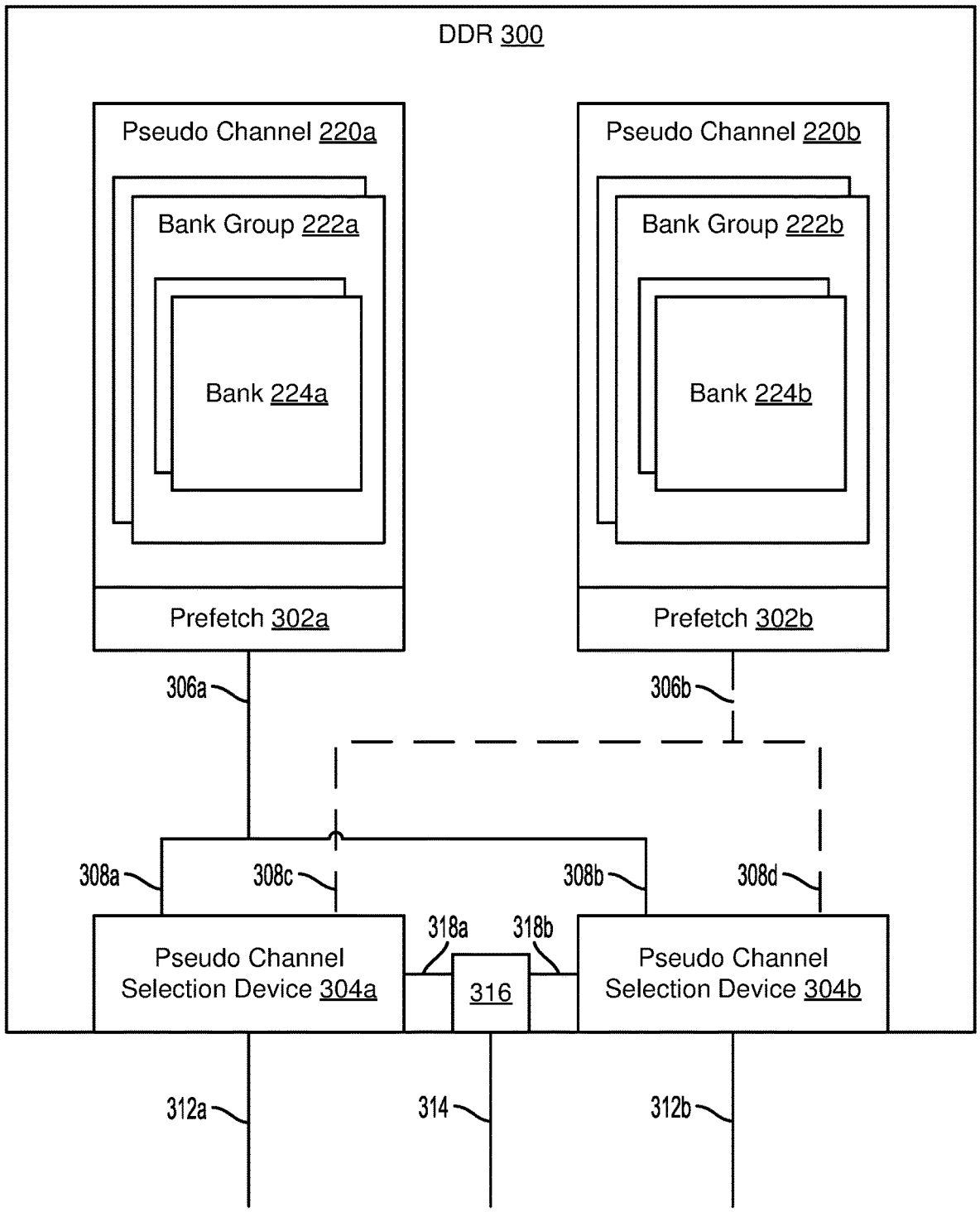
FIGS. 4A-4C are component block and functional diagrams illustrating example pseudo channel based memory systems suitable for implementing various embodiments.
Figure 4B:
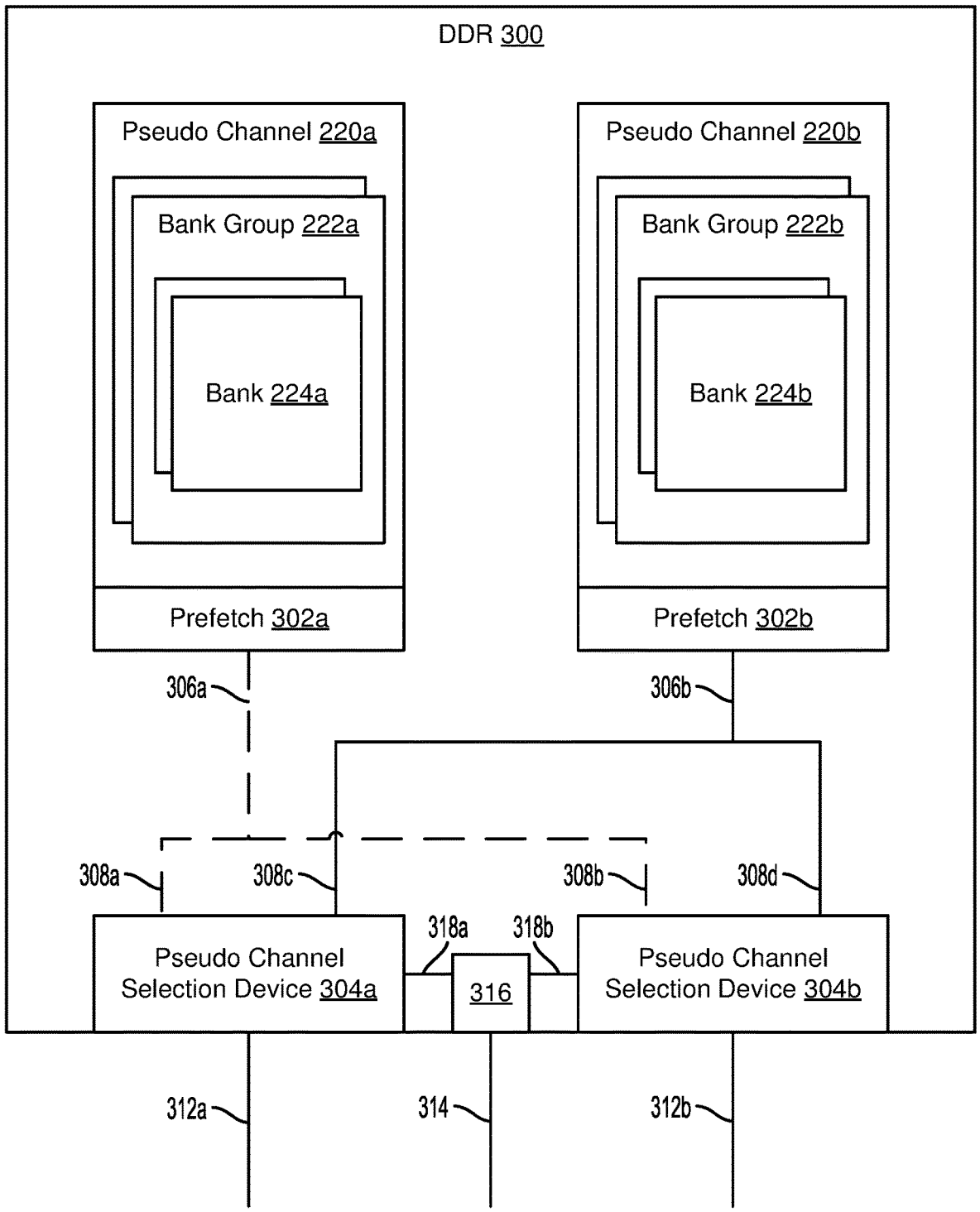
Figure 4C:
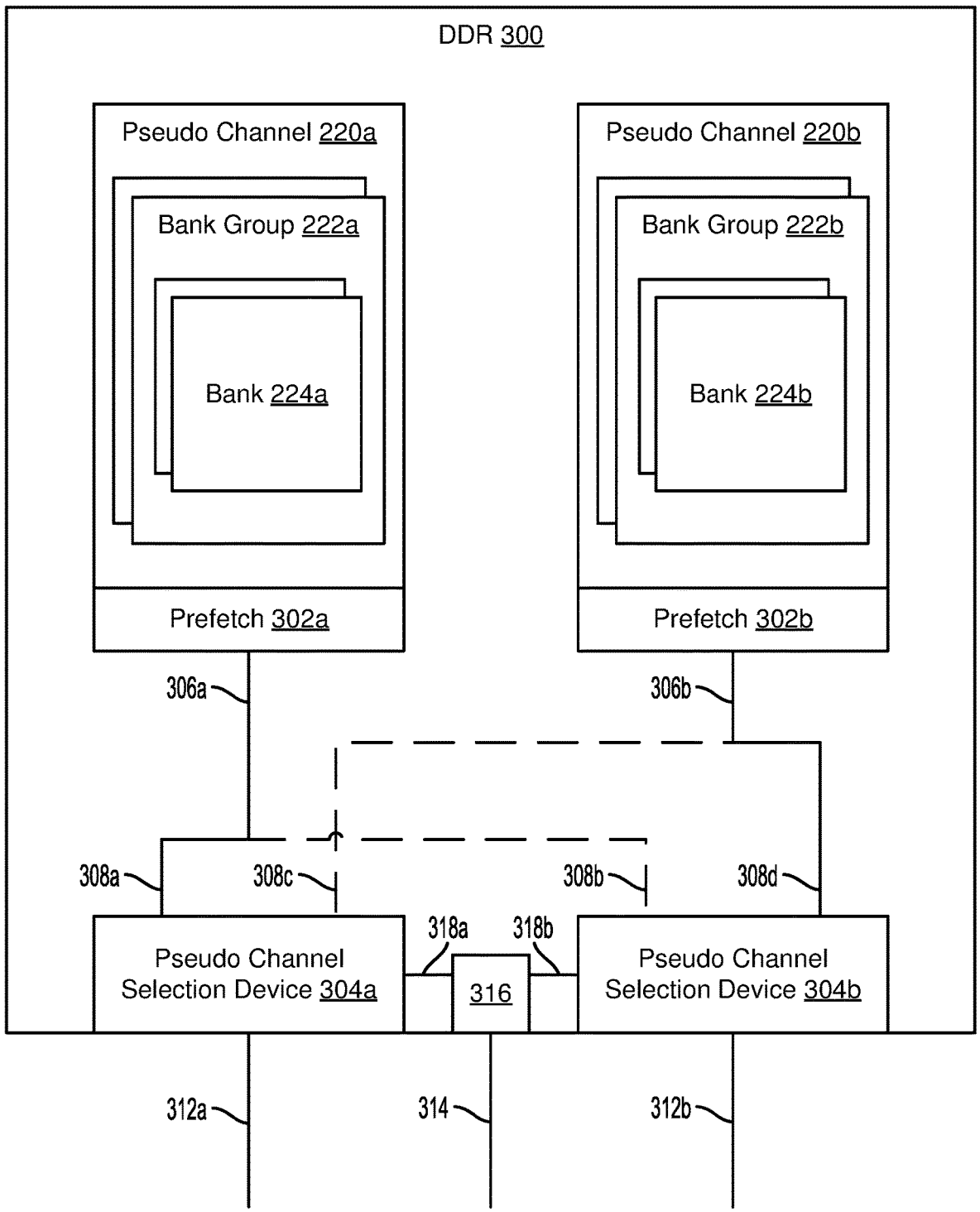

FIGS. 4A-4C illustrate example functions of the pseudo channel based memory system (e.g., memory 106, memory 114 in FIG. 1) suitable for implementing various embodiments. With reference to FIGS. 1-4C, the example pseudo channel based memory system may include the DDR chip 300a (e.g., DDR chip 200 in FIG. 2), including the pseudo channels 220a, 220b, the banks 224a, 224b, the bank groups 222a, 222b, the prefetch memories 302a, 302b, the pseudo channel selection devices 304a, 304b, the internal data buses 306a, 306b, 308a, 308b, 308c, 308d, the pseudo channel controller 316, and the pseudo channel selection signal lines 318a, 318b. The DDR chip 300a may also include the pseudo channel data buses 312a, 312b, and the CA bus 314.

Examples illustrated in FIGS. 4A and 4B may be of the DDR chip 300a and/or components thereof, including the pseudo channel selection devices 304a, 304b and the pseudo channel controller 316 operating in a first operation mode for implementing a low latency type memory access. Referring to FIG. 4A, the pseudo channel controller 316 may determine a low latency type memory access targeted at the pseudo channel 220a. The pseudo channel controller 316 may send a pseudo channel selection signal to the pseudo channel selection device 304a configured to cause the pseudo channel selection device 304a to communicatively connect the pseudo channel 220a to the pseudo channel data bus 312a. In response, the pseudo channel selection device 304a may communicatively connect the pseudo channel 220a to the pseudo channel data bus 312a via internal data buses 306a, 308a. For the same low latency type memory access targeted at the pseudo channel 220a, the pseudo channel controller 316 may send a pseudo channel selection signal to the pseudo channel selection device 304b configured to cause the pseudo channel selection device 304b to communicatively connect the pseudo channel 220a to the pseudo channel data bus 312b. In response, the pseudo channel selection device 304b may communicatively connect the pseudo channel 220a to the pseudo channel data bus 312b via internal data buses 306a, 308b. Communicatively connecting the pseudo channel 220a to the pseudo channel data buses 312a, 312b may include communicatively disconnecting the pseudo channel 220b from the pseudo channel data buses 312a, 312b by the pseudo channel selection devices 304a, 304b (shown with internal data buses 306b, 308c, 308d in broken lines).

For a low latency type read memory access, data may be read out of the prefetch memory 302a associated with the pseudo channel 220a and provided to the pseudo channel data buses 312a, 312b via the internal data buses 306a, 308a, 308b and the pseudo channel selection devices 304a, 304b. For a low latency type write memory access, data may be written to banks 224a associated with the pseudo channel 220a, provided from the pseudo channel data buses 312a, 312b via the internal data buses 306a, 308a, 308b and the pseudo channel selection devices 304a, 304b.

As mentioned above, in an alternative implementation, the pseudo channel selection device 304a may communicatively connect the pseudo channel 220a to the pseudo channel data bus 312a via a dedicated internal data bus (not shown). Likewise, the pseudo channel selection device 304b may communicatively connect the pseudo channel 220a to the pseudo channel data bus 312b via a dedicated internal data bus (not shown).

Referring to FIG. 4B, the pseudo channel controller 316 may determine a low latency type memory access targeted at the pseudo channel 220b. The pseudo channel controller 316 may send a pseudo channel selection signal to the pseudo channel selection device 304a configured to cause the pseudo channel selection device 304a to communicatively connect the pseudo channel 220b to the pseudo channel data bus 312a. In response, the pseudo channel selection device 304a may communicatively connect the pseudo channel 220b to the pseudo channel data bus 312a via internal data buses 306b, 308c. For the same low latency type memory access targeted at the pseudo channel 220b, the pseudo channel controller 316 may send a pseudo channel selection signal to the pseudo channel selection device 304b configured to cause the pseudo channel selection device 304b to communicatively connect the pseudo channel 220b to the pseudo channel data bus 312b. In response, the pseudo channel selection device 304b may communicatively connect the pseudo channel 220b to the pseudo channel data bus 312b via internal data buses 306b, 308d. Communicatively connecting the pseudo channel 220b to the pseudo channel data buses 312a, 312b may include communicatively disconnecting the pseudo channel 220a from the pseudo channel data buses 312*a*, 312*b* by the pseudo channel selection devices 304*a*, 304*b* (shown with internal data buses 306*a*, 308*a*, 308*b* in broken lines).

For a low latency type read memory access, data may be read out of the prefetch memory 302*b* associated with the pseudo channel 220*b* and provided to the pseudo channel data buses 312*a*, 312*b* via the internal data buses 306*b*, 308*c*, 308*d* and the pseudo channel selection devices 304*a*, 304*b*. For a low latency type write memory access, data may be written to banks 224*b* associated with the pseudo channel 220*b*, and provided from the pseudo channel data buses 312*a*, 312*b* via the internal data buses 306*b*, 308*c*, 308*d* and the pseudo channel selection devices 304*a*, 304*b*.

As mentioned above, in an alternative implementation, the pseudo channel selection device 304*a* may communicatively connect the pseudo channel 220*b* to the pseudo channel data bus 312*a* via a dedicated internal data bus (not shown). Likewise, the pseudo channel selection device 304*b* may communicatively connect the pseudo channel 220*b* to the pseudo channel data bus 312*b* via a dedicated internal data bus (not shown).

The example illustrated in FIG. 4C is of the DDR chip 300*a* and/or components thereof, including the pseudo channel selection devices 304*a*, 304*b* and the pseudo channel controller 316, operating in a second operation mode for implementing a standard or non-low latency type memory access. Referring to FIG. 4C, the pseudo channel controller 316 may determine a standard or non-low latency type memory access targeted at either pseudo channel 220*a*, 220*b*. The pseudo channel controller 316 may send a pseudo channel selection signal to the pseudo channel selection device 304*a* configured to cause the pseudo channel selection device 304*a* to communicatively connect the pseudo channel 220*a* to the pseudo channel data bus 312*a*. In response, the pseudo channel selection device 304*a* may communicatively connect the pseudo channel 220*a* to the pseudo channel data bus 312*a* via internal data buses 306*a*, 308*a*. Communicatively connecting the pseudo channel 220*a* to the pseudo channel data bus 312*a* may include communicatively disconnecting the pseudo channel 220*b* from the pseudo channel data bus 312*a* by the pseudo channel selection devices 304*a* (shown with internal data bus 308*c* in broken lines). For the same standard or non-low latency type memory access targeted at either pseudo channel 220*a*, 220*b*, the pseudo channel controller 316 may send a pseudo channel selection signal to the pseudo channel selection device 304*b* configured to cause the pseudo channel selection device 304*b* to communicatively connect the pseudo channel 220*b* to the pseudo channel data bus 312*b*. In response, the pseudo channel selection device 304*b* may communicatively connect the pseudo channel 220*b* to the pseudo channel data bus 312*b* via internal data buses 306*b*, 308*d*. Communicatively connecting the pseudo channel 220*b* to the pseudo channel data bus 312*b* may include communicatively disconnecting the pseudo channel 220*a* from the pseudo channel data bus 312*b* by the pseudo channel selection devices 304*b* (shown with internal data bus 308*b* in broken lines).

For a standard or non-low latency type read memory access, data may be read out of the prefetch memory 302*a*, 302*b* associated with the targeted pseudo channel 220*a*, 220*b* and provided to the pseudo channel data buses 312*a*, 312*b* communicatively connected to the targeted pseudo channel 220*a*, 220*b* via the appropriate internal data buses 306*a*, 306*b*, 308*a*, 308*d* and the appropriate pseudo channel selection device 304*a*, 304*b*. For a standard or non-low latency type write memory access, data may be written to banks 224*a*, 224*b* associated with the targeted pseudo channel 220*a*, 220*b*, provided from the pseudo channel data buses 312*a*, 312*b* communicatively connected to the targeted pseudo channel 220*a*, 220*b* via the appropriate internal data buses 306*a*, 306*b*, 308*a*, 308*d* and the appropriate pseudo channel selection devices 304*a*, 304*b*.

In an alternative implementation, the pseudo channel selection device 304*a* may communicatively connect the pseudo channel 220*a* to the pseudo channel data bus 312*a* via a dedicated internal data bus (not shown). Likewise, the pseudo channel selection device 304*b* may communicatively connect the pseudo channel 220*b* to the pseudo channel data bus 312*b* via a dedicated internal data bus (not shown).

The forgoing examples described with reference to FIGS. 4A-4C may be similarly applicable to the example pseudo channel based memory system illustrated in FIG. 3B including the DDR chip 300*b* (e.g., DDR chip 200 in FIG. 2) (not shown), including the pseudo channels 220*a*, 220*b*, the banks 224*a*, 224*b*, the bank groups 222*a*, 222*b*, the prefetch memories 302*a*, 302*b*, the pseudo channel selection devices 304*a*, 304*b*, 320, the internal data buses 306*a*, 306*b*, 308*a*, 308*b*, 308*c*, 308*d*, the pseudo channel controller 316, and the pseudo channel selection signal line(s) 318*c*. The DDR chip 300*b* may also include the pseudo channel data buses 312*a*, 312*b*, and the CA bus 314. However, rather than the pseudo channel controller 316 transmitting pseudo channel selection signals to the pseudo channel selection devices 304*a*, 304*b* via the pseudo channel selection signal lines 318*a*, 318; the pseudo channel controller 316 may transmit pseudo channel selection signal(s) to the pseudo channel selection devices 304*a*, 304*b*, 320 via the pseudo channel selection signal line(s) 318*c*. In some embodiments, the pseudo channel controller 316 may transmit one or more pseudo channel selection signals to the pseudo channel selection device 320, which may transmit the one or more pseudo channel selection signals to the pseudo channel selection devices 304*a*, 304*b*.

Figure 5:
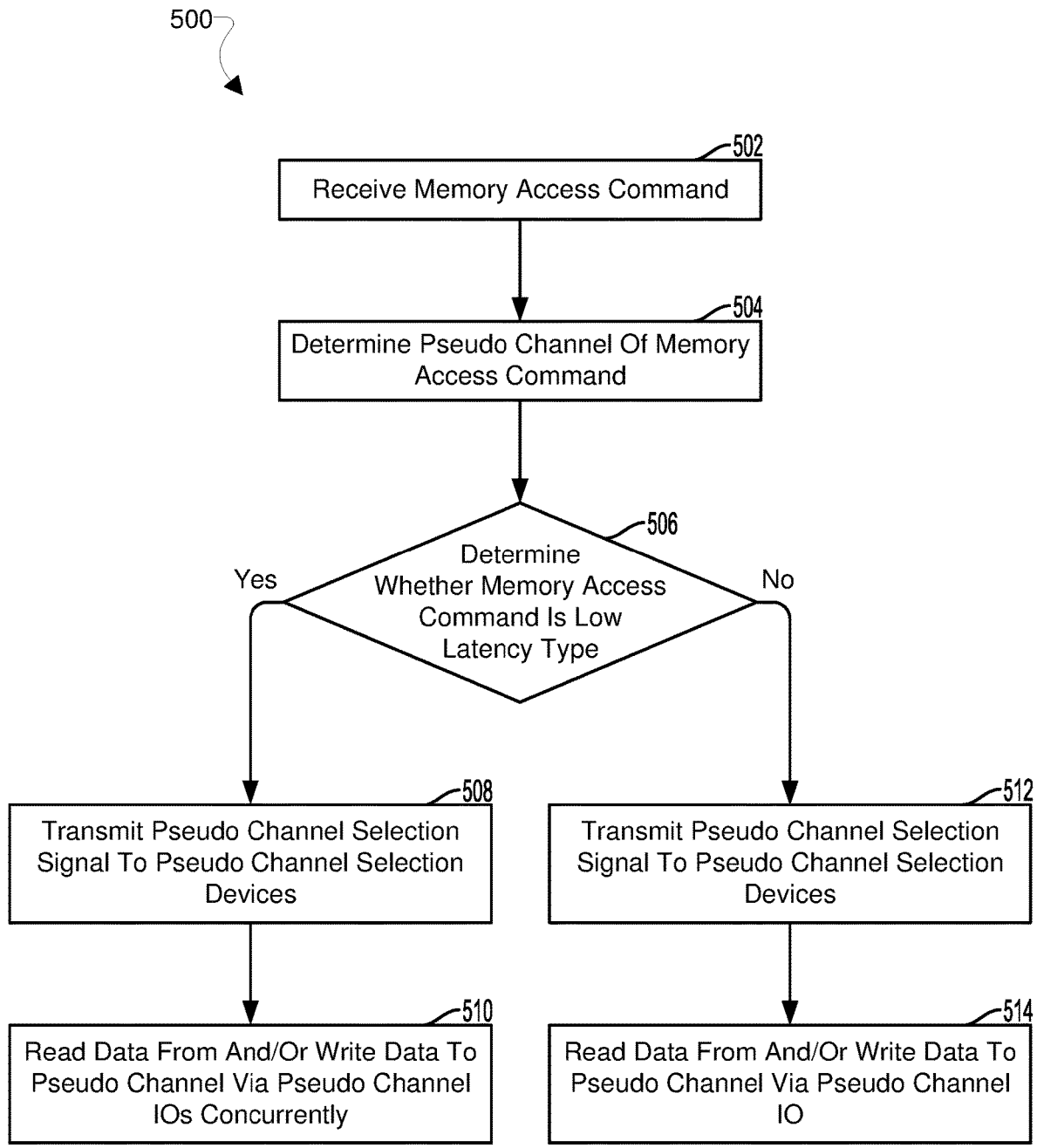
FIG. 5 is a process flow diagram illustrating a method for reducing latency in pseudo channel based memory systems according to an embodiment.

FIG. 5 illustrates a method 500 for reducing latency in pseudo channel based 300*a*, 300*b* in FIGS. 3A-4C) according to some embodiments. With reference to FIGS. 1-5, the method 500 may be implemented in a computing device (e.g., computing device 100 in FIG. 1), in hardware, in software executing in a processor, or in a combination of a software-configured processor and dedicated hardware that includes other individual components, such as various memories/caches (e.g., memory 106, memory 114 in FIG. 1, DDR 200 in FIG. 2, DDR 300*a*, 300*b* in FIGS. 3A-4C, banks 224*a*, 224*b* in FIGS. 2-4C) and various memory/cache controllers (e.g., pseudo channel controller 316 in FIGS. 3A-4C). In order to encompass the alternative configurations enabled in various embodiments, the hardware implementing the method 500 is referred to herein as a "memory control device."

In block 502, the memory control device may receive a memory access command. The memory access command may include a standard or non-low latency type memory access command, or a low latency type memory access command. The standard or non-low latency type memory access command and the low latency type memory access command may be memory access type commands for which the low latency type memory access command may be configured to provide a memory access with a lower latency than a standard or non-low latency type memory access command. In some examples, the memory access command may include an aspect configured to indicate whether the memory access command is a low latency type memory access command. For example, the memory access command may include a field configured to have a value for indicating whether the memory access command is a low latency type memory access command. The memory access command may also be associated with a target address for the memory access command, which may reside in a pseudo channel (e.g., pseudo channel 220a, 220b in FIGS. 2-4C).

The memory access command may be received by the memory control device via a CA bus (e.g., CA bus 214 in FIG. 2, CA bus 314 in FIGS. 3A-4C). In some examples, the memory access command may be a write memory access, and data associated with the write memory access may be received at a memory e.g., memory 106, memory 114 in FIG. 1, DDR 200 in FIG. 2, DDR 300a, 300b in FIGS. 3A-4C) associated with or included in the memory control device via one or more pseudo channel data buses (e.g., data bus 204a, 204b in FIG. 2, pseudo channel data bus 312a, 312b in FIGS. 3A-4C). For example, for a standard or non-low latency type write memory access, data may be received on a pseudo channel data bus dedicated to the target pseudo channel. In another example, for a low latency type write memory access, data may be received on multiple pseudo channel data buses, one of which may be a pseudo channel data bus dedicated to the target pseudo channel. In some examples, the memory control device receiving the memory access command in block 502 may include a pseudo channel controller (e.g., pseudo channel controller 316 in FIGS. 3A-4C).

In block 504, the memory control device may determine a pseudo channel of the memory access command. The memory control device may use the address received for the memory access command and determine the pseudo channel in which the address resides. In some examples, the memory control device may access a data structure, such as a table, array, etc. associating a pseudo channel identifier (ID) of a pseudo channel with an address range for the pseudo channel. The memory control device may compare the address of the memory access command to the address ranges of the pseudo channels, and determine the pseudo channel ID associated with address range in which the address of the memory access command resides. In some examples, the memory control device determining the pseudo channel of the memory access command in block 504 may include a pseudo channel controller.

In determination block 506, the memory control device may determine whether the received memory access command is a low latency type memory access command. The memory control device may interpret the aspect of the memory access command configured for indicating whether the memory access command is a low latency type memory access command to determine whether the received memory access command is a low latency type memory access command. For example, a value in a field of the memory access command may be configured to indicate whether the memory access command is a low latency type memory access command. In some examples, the value may be a bit value for which a "1" may indicate a low latency type memory access command and a "0" may indicate a standard or non-low latency type memory access command, or vice versa. In some examples, the memory control device determining whether the received memory access command is a low latency type memory access command in determination block 506 may include the pseudo channel controller.

In response to determining that the received memory access command is a low latency type memory access command (i.e., determination block 506="Yes"), the memory control device may transmit pseudo channel selection signals to two or more pseudo channel selection devices (e.g., pseudo channel selection devices 304a, 304b, 320 in FIGS. 3A-4C) in block 508. The pseudo channel selection signals may be configured to cause the pseudo channel selection devices to configure communicative connections between one or more pseudo channel data buses and multiple internal data buses (e.g., internal data bus 306a, 306b, 308a, 308b, 308c, 308d in FIGS. 3A-4C). In effect, the pseudo channel selection signals may be configured to cause the pseudo channel selection devices to configure communicative connections between one or more pseudo channel data buses and the pseudo channels, including banks (e.g., bank 224a, 224b in FIGS. 2-4C) of the pseudo channels. The pseudo channel selection signals may indicate to the pseudo channel selection devices to communicatively connect the pseudo channel targeted by the low latency type memory access command to multiple pseudo channel data buses. In some examples, the memory control device may transmit the same pseudo channel selection signal to the pseudo channel selection devices. In some examples, the memory control device may transmit different pseudo channel selection signals to the pseudo channel selection devices. In some examples, transmitting the pseudo channel selection signals to the pseudo channel selection devices may include transmitting no pseudo channel selection signals. For example, in response to receiving no pseudo channel selection signals, the pseudo channel selection devices may default to selection of a particular (pre-configured) pseudo channel. The memory control device may operate in a first operation mode for implementing a low latency type memory access. In some examples, the memory control device transmitting the pseudo channel selection signals to the pseudo channel selection devices in block 508 may include the pseudo channel controller.

In block 510, the memory control device may read data from and/or write data to the target pseudo channel via pseudo channel IOs concurrently (e.g., pseudo channel IO 202a, 202b, data bus 204a, 204b in FIG. 2, pseudo channel selection devices 304a, 304b, 320, pseudo channel data bus 312a, 312b in FIGS. 3A-4C). The target pseudo channel of the low latency type memory access command may be read from and/or written to memory using multiple pseudo channel data buses via communicative connections configured by the pseudo channel selection devices. Conventionally, the target pseudo channel of any memory access command may be read from and/or written to using only a single pseudo channel data bus dedicated to the pseudo channel Thus, the bit width of the IO of the pseudo channel is limited by the bit width of the single pseudo channel data bus. By enabling reading from and/or writing to the target pseudo channel of the low latency type memory access command using multiple pseudo channel data buses concurrently, the bit width of the IO of the pseudo channel may be increased compared to use of the single pseudo channel data bus by using up to the full bit width of the multiple pseudo channel data buses. Further, the increased bit width of the IO of the pseudo channel may enable a reduced burst length for reading from and/or writing to the pseudo channel as more data can be read and/or written concurrently using the multiple pseudo channel data buses. In some embodiments, the memory control device reading data from and/or writing data to the pseudo channel via the pseudo channel IOs concurrently in block 510 may include the pseudo channel controller, the pseudo channel selection devices, and/or pseudo channel IOs (e.g., pseudo channel IO 202a, 202b in FIG. 2).

In response to determining that the received memory access command is not a low latency type memory access command (i.e., determination block 506="No"), the memory control device may transmit pseudo channel selection signals to one or more pseudo channel selection devices in block 512. The pseudo channel selection signals may be similar to the pseudo channel selection signals described in block 508. However, the pseudo channel selection signals may cause the pseudo channel selection devices to communicatively connect the pseudo channel targeted by the standard or non-low latency type memory access command to a single pseudo channel data bus dedicated to the pseudo channel. The memory control device may operate in a second operation mode for implementing a standard or non-low latency type memory access. In some examples, the memory control device transmitting the pseudo channel selection signals to the pseudo channel selection devices in block 512 may include the pseudo channel controller.

In block 514, the memory control device may read data from and/or write data to the target pseudo channel via the single, dedicated pseudo channel 10. The target pseudo channel of the standard or non-low latency type memory access command may be read from and/or written to using the single, dedicated pseudo channel data bus via a communicative connection configured by the respective pseudo channel selection device. In some embodiments, the memory control device reading data from and/or writing data to the pseudo channel via the single, dedicated pseudo channel IO in block 514 may include the pseudo channel controller, the pseudo channel selection devices, and/or pseudo channel IOs (e.g., pseudo channel IO 202*a*, 202*b* in FIG. 2).

Figure 6:
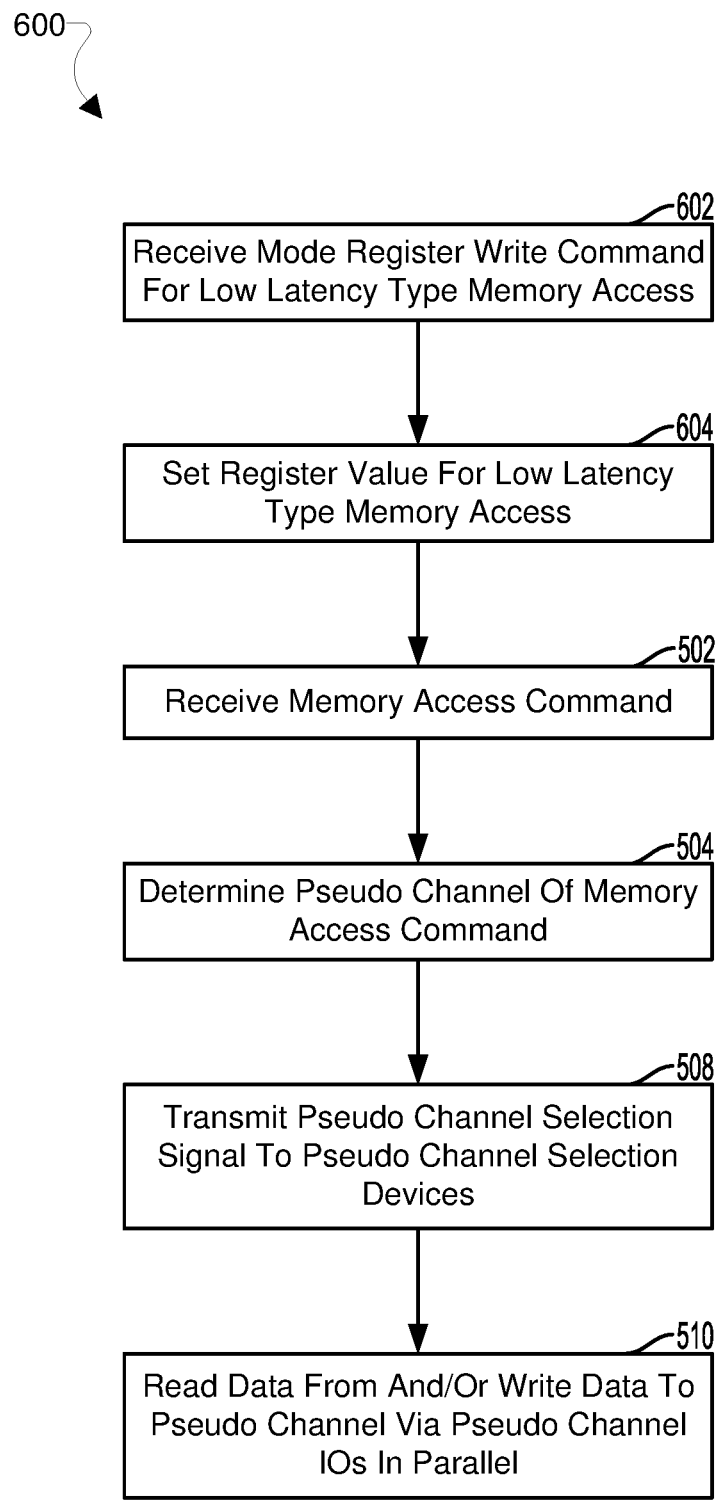
FIG. 6 is a process flow diagram illustrating a method for reducing latency in pseudo channel based memory systems according to an embodiment.

FIG. 6 illustrates a method 600 for reducing latency in pseudo channel based memory systems (e.g., memory 106, memory 114 in FIG. 1, DDR 200 in FIG. 2, DDR 300*a*, 300*b* in FIGS. 3A-4C) according to some embodiments. With reference to FIGS. 1-6, the method 600 may be implemented in a computing device (e.g., computing device 100 in FIG. 1), in hardware, in software executing in a processor, or in a combination of a software-configured processor and dedicated hardware that includes other individual components, such as various memories/caches (e.g., memory 106, memory 114 in FIG. 1, DDR 200 in FIG. 2, DDR 300*a*, 300*b* in FIGS. 3A-4C, banks 224*a*, 224*b* in FIGS. 2-4C) and various memory/cache controllers (e.g., pseudo channel controller 316 in FIGS. 3A-4C). In order to encompass the alternative configurations enabled in various embodiments, the hardware implementing the method 600 is referred to herein as a "memory control device." Blocks 502, 504, 508, 510 may be implemented in manners similar to like numbered blocks of the method 500 described herein with reference to FIG. 5.

In block 602, the memory control device may receive a mode register write command for low latency type memory access. The mode register write command may be configured to prompt the memory control device to set a register value to indicate to the memory control device that any following memory access commands are to be implemented as low latency type memory accesses.

In block 604, the memory control device may set the register value for low latency type memory access. Thereafter, the memory control device may operate in a first operation mode for implementing low latency type memory accesses. The memory control device receiving the mode register write command for low latency type memory access in block 602, and setting the register value for low latency type memory access in block 604 may include a pseudo channel controller (e.g., pseudo channel controller 316 in FIGS. 3A-4C).

In block 502, the memory control device may receive a memory access command. In some examples, the memory control device receiving the memory access command in block 502 may include a pseudo channel controller (e.g., pseudo channel controller 316 in FIGS. 3A-4C).

In block 504, the memory control device may determine a pseudo channel (e.g., pseudo channel 220*a*, 220*b* in FIGS. 2-4C) of the memory access command. In some examples, the memory control device determining the pseudo channel of the memory access command in block 504 may include a pseudo channel controller.

In block 508 the memory control device may transmit pseudo channel selection signals to pseudo channel selection devices (e.g., pseudo channel selection devices 304*a*, 304*b*, 320 in FIGS. 3A-4C). In some examples, the memory control device transmitting the pseudo channel selection signals to the pseudo channel selection devices in block 508 may include the pseudo channel controller.

In block 510, the memory control device may read data from and/or write data to the pseudo channel via pseudo channel IOs concurrently (e.g., data bus 204*a*, 204*b* in FIG. 2, pseudo channel selection devices 304*a*, 304*b*, 320, pseudo channel data bus 312*a*, 312*b* in FIGS. 3A-4C). In some embodiments, the memory control device reading data from and/or writing data to the pseudo channel via the pseudo channel IOs concurrently in block 510 may include the pseudo channel controller, the pseudo channel selection devices, and/or pseudo channel IOs (e.g., pseudo channel IO 202*a*, 202*b* in FIG. 2).

Figure 7:
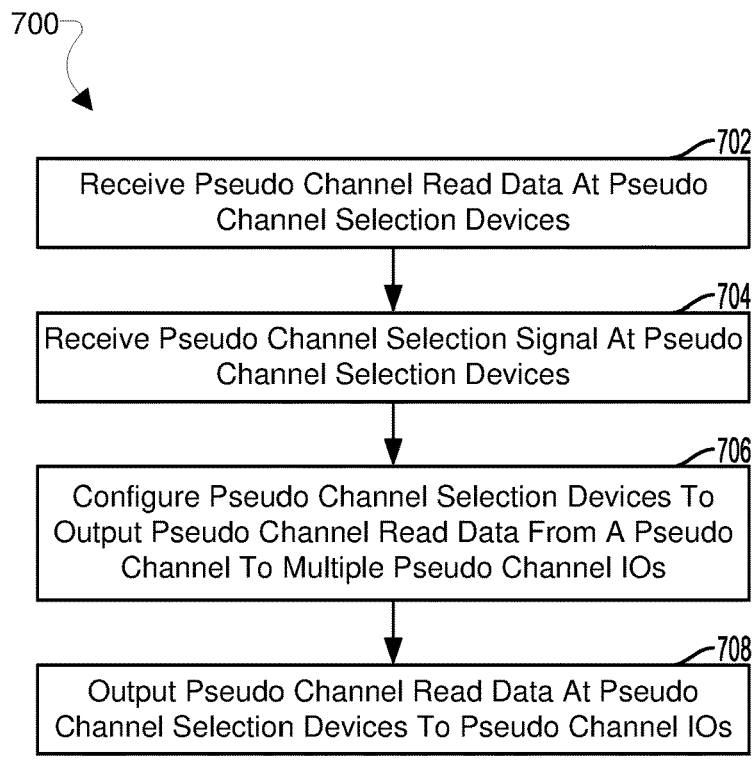
FIG. 7 is a process flow diagram illustrating a method for reducing latency in pseudo channel based memory systems for a read memory command according to an embodiment.

FIG. 7 illustrates a method 700 for reducing latency in pseudo channel based memory systems (e.g., memory 106, memory 114 in FIG. 1, DDR 200 in FIG. 2, DDR 300*a*, 300*b* in FIGS. 3A-4C) for a read memory command according to an embodiment. With reference to FIGS. 1-7, the method 700 may be implemented in a computing device (e.g., computing device 100 in FIG. 1), in hardware, in software executing in a processor, or in a combination of a software-configured processor and dedicated hardware that includes other individual components, such as various memories/caches (e.g., memory 106, memory 114 in FIG. 1, DDR 200 in FIG. 2, DDR 300*a*, 300*b* in FIGS. 3A-4C, banks 224*a*, 224*b* in FIGS. 2-4C, pseudo channel selection devices 304*a*, 304*b*, 320 in FIGS. 3A-4C) and various memory/cache controllers (e.g., pseudo channel controller 316 in FIGS. 3A-4C). In order to encompass the alternative configurations enabled in various embodiments, the hardware implementing the method 700 is referred to herein as a "memory control device." Blocks 702, 704, 706, 708 include further details regarding operations in block 510 of the methods 500, 600 as described.

In block 702, the memory control device may receive pseudo channel read data. The pseudo channel read data may be read out of a prefetch memory (e.g., prefetch memory 302*a*, 302*b* in FIGS. 3A-4C) associated with or included in a target pseudo channel (e.g., pseudo channel 220*a*, 220*b* in FIGS. 3A-4C) of a low latency type read memory access. The pseudo channel read data may be transmitted to multiple pseudo channel selection devices (e.g., pseudo channel selection devices 304*a*, 304*b*, 320 in FIGS. 3A-4C) via internal data buses (e.g., internal data bus 306*a*, 306*b*, 308*a*, 308*b*, 308*c*, 308*d* in FIGS. 3A-4C). In some examples, the memory control device receiving the pseudo channel read data in block 702 may include the multiple pseudo channel selection devices.

In block 704, the memory control device may receive a pseudo channel selection signal. The pseudo channel selection signal may be the pseudo channel selection signal transmitted in block 508 of the methods 500, 600 as described. The pseudo channel selection signal may be received at the multiple pseudo channel selection devices. In some examples, the memory control device receiving the pseudo channel selection signal in block 704 may include the multiple pseudo channel selection devices.

In block 706, the memory control device may configure the pseudo channel selection devices to output pseudo channel read data from the target pseudo channel to multiple pseudo channel IOs (e.g., pseudo channel IO 202a, 202b, data bus 204a, 204b in FIG. 2, pseudo channel data bus 312a, 312b in FIGS. 3A-4C). The pseudo channel selection devices may be configured to communicatively connect respective pseudo channel data buses (e.g., data bus 204a, 204b in FIG. 2, pseudo channel data bus 312a, 312b in FIGS. 3A-4C) and multiple internal data buses. In effect, the pseudo channel selection devices may be configured to communicatively connect multiple pseudo channel data buses and the target pseudo channel, including banks (e.g., bank 224a, 224b in FIGS. 2-4C) of the target pseudo channel. The pseudo channel selection devices may be configured to communicatively connect the pseudo channel targeted by the low latency type read memory access to multiple pseudo channel data buses in response to the pseudo channel selection signal. In some examples, the memory control device configuring the pseudo channel selection devices to output pseudo channel read data from the target pseudo channel to multiple pseudo channel IOs in block 706 may include the multiple pseudo channel selection devices.

In block 708, the memory control device may output the pseudo channel read data at the pseudo channel selection devices to the pseudo channel IOs. The memory control device may concurrently output the pseudo channel read data, received in block 702, to the multiple pseudo channel IOs communicatively connected to the target pseudo channel of the low latency type read memory access in block 706. In some examples, the memory control device outputting the pseudo channel read data at the pseudo channel selection devices to the pseudo channel IOs in block 708 may include the multiple pseudo channel selection devices and/or the pseudo channel IOs.

Figure 8:
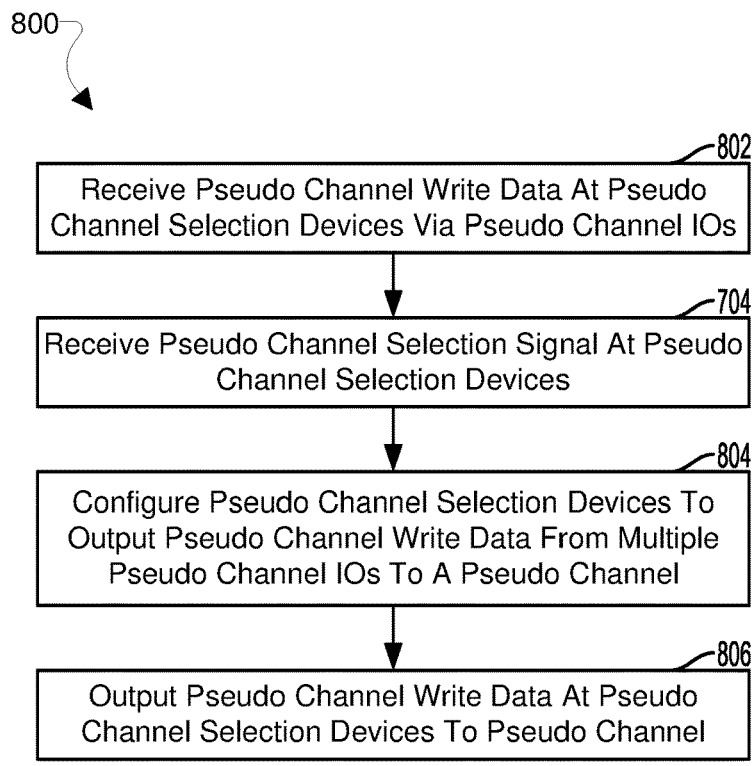
FIG. 8 is a process flow diagram illustrating a method for reducing latency in pseudo channel based memory systems for a write memory command according to an embodiment.

FIG. 8 illustrates a method 800 for reducing latency in pseudo channel based 300a, 300b in FIGS. 3A-4C) for a write memory command according to an embodiment. With reference to FIGS. 1-8, the method 800 may be implemented in a computing device (e.g., computing device 100 in FIG. 1), in hardware, in software executing in a processor, or in a combination of a software-configured processor and dedicated hardware that includes other individual components, such as various memories/caches (e.g., memory 106, memory 114 in FIG. 1, DDR 200 in FIG. 2, DDR 300a, 300b in FIGS. 3A-4C, banks 224a, 224b in FIGS. 2-4C, pseudo channel selection devices 304a, 304b, 320 in FIGS. 3A-4C) and various memory/cache controllers (e.g., pseudo channel controller 316 in FIGS. 3A-4C). In order to encompass the alternative configurations enabled in various embodiments, the hardware implementing the method 800 is referred to herein as a "memory control device." Blocks 802, 804, 806 include more detailed operations that may be performed in block 510 of the methods 500, 600 described herein with reference to FIGS. 5 and 6.

In block 802, the memory control device may receive pseudo channel write data at pseudo channel selection devices (e.g., pseudo channel selection devices 304a, 304b, 320 in FIGS. 3A-4C) via multiple pseudo channel IOs (e.g., pseudo channel IO 202a, 202b, data bus 204a, 204b in FIG. 2, pseudo channel data bus 312a, 312b in FIGS. 3A-4C). The pseudo channel write data may be received from a host (e.g., CPU 104, processor 124 in FIG. 1) concurrently via multiple pseudo channel data buses (e.g., data bus 204a, 204b in FIG. 2, pseudo channel data bus 312a, 312b in FIGS. 3A-4C) for a low latency type write memory access. Each pseudo channel data bus may be communicatively connected to a different pseudo channel selection device. The data transmitted by each pseudo channel data bus may be received concurrently at the respective communicatively connected pseudo channel selection devices. In some examples, the memory control device receiving the pseudo channel write data at the pseudo channel selection devices via the multiple pseudo channel IOs in block 802 may include the multiple pseudo channel selection devices.

In block 704, the memory control device may receive a pseudo channel selection signal. The pseudo channel selection signal may be the pseudo channel selection signal transmitted in block 508 of the methods 500, 600 described herein with reference to FIGS. 5 and 6. The pseudo channel selection signal may be received at the multiple pseudo channel selection devices. In some examples, the memory control device receiving the pseudo channel selection signal in block 804 may include the multiple pseudo channel selection devices.

In block 804, the memory control device may configure the pseudo channel selection devices to output the pseudo channel write data from multiple pseudo channel IOs to the target pseudo channel (e.g., pseudo channel 220a, 220b in FIGS. 3A-4C) of the low latency type write memory access. The pseudo channel selection devices may be configured to communicatively connect respective pseudo channel data buses (e.g., data bus 204a, 204b in FIG. 2, pseudo channel data bus 312a, 312b in FIGS. 3A-4C) and multiple internal data buses (e.g., internal data bus 306a, 306b, 308a, 308b, 308c, 308d in FIGS. 3A-4C). In effect, the pseudo channel selection devices may be configured to communicatively connect multiple pseudo channel data buses and the target pseudo channel, including banks (e.g., bank 224a, 224b in FIGS. 2-4C) of the target pseudo channel. The pseudo channel selection devices may be configured to communicatively connect the pseudo channel targeted by the low latency type write memory access to multiple pseudo channel data buses in response to the pseudo channel selection signal. In some examples, the memory control device configuring the pseudo channel selection devices to output the pseudo channel write data from multiple pseudo channel IOs to the target pseudo channel of the low latency type write memory access in block 806 may include the multiple pseudo channel selection devices.

In block 806, the memory control device may output the pseudo channel write data at the pseudo channel selection devices to the target pseudo channel of the low latency type write memory access. The memory control device may output the pseudo channel write data, received in block 802, to the target pseudo channel of the low latency type write memory access communicatively connected to multiple pseudo channel IOs in block 806. In some examples, the memory control device outputting the pseudo channel write data at the pseudo channel selection devices to the target pseudo channel of the low latency type write memory access in block 808 may include the multiple pseudo channel selection devices.

Figure 9:
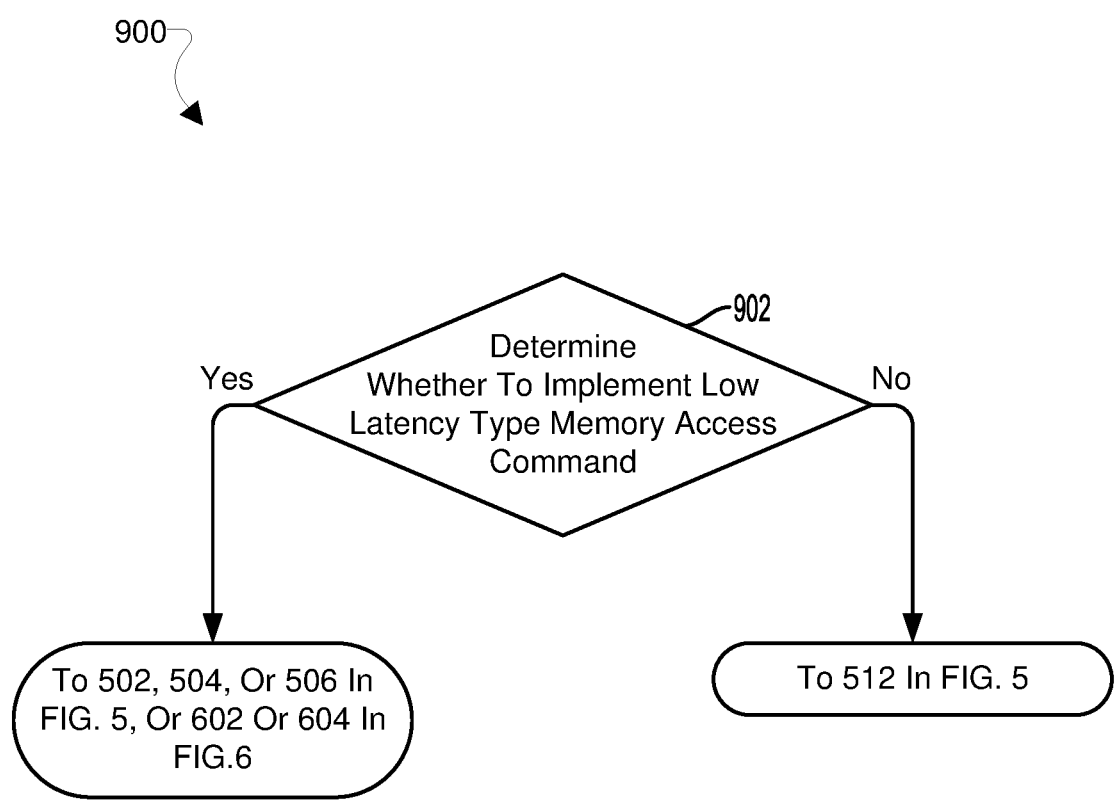
FIG. 9 is a process flow diagram illustrating a method for reducing latency in pseudo channel based memory systems according to an embodiment.

FIG. 9 illustrates a method 900 for reducing latency in pseudo channel based memory systems (e.g., memory 106, memory 114 in FIG. 1, DDR 200 in FIG. 2, DDR 300a, 300b in FIGS. 3A-4C) according to an embodiment. With reference to FIGS. 1-9, the method 900 may be implemented in a computing device (e.g., computing device 100 in FIG. 1), in hardware, in software executing in a processor, or in a combination of a software-configured processor and dedicated hardware that includes other individual components, such as various memories/caches (e.g., memory 106, memory 114 in FIG. 1, DDR 200 in FIG. 2, DDR 300a, 300b in FIGS. 3A-4C, banks 224a, 224b in FIGS. 2-4C) and various memory/cache controllers (e.g., pseudo channel controller 316 in FIGS. 3A-4C). In order to encompass the alternative configurations enabled in various embodiments, the hardware implementing the method 900 is referred to herein as a "memory control device." In some examples, the method 900 may be implemented prior to and/or concurrently with the methods 500, 600 described herein with reference to FIGS. 5 and 6.

In determination block 902, the memory control device may determine whether to implement low latency memory access commands. In some examples, conditions may be met to determine whether to implement low latency memory access commands. For example, implementing low latency memory access commands may depend on a clock frequency of the pseudo channel based memory system. For example, low latency memory access commands may be implemented for the clock frequency of the pseudo channel based memory system equal to or less than a threshold, such as 1600 MHz. As another example, implementing low latency memory access commands may depend on an IO scheme implemented for the pseudo channel based memory system. For example, low latency memory access commands may be implemented for an NRZ coding IO scheme implemented for the pseudo channel based memory system. As another example, implementing low latency memory access commands may depend on a combination of the clock frequency of the pseudo channel based memory system and the IO scheme implemented for the pseudo channel based memory system. For example, low latency memory access commands may be implemented for the clock frequency of the pseudo channel based memory system equal to or less than the threshold, such as 1600 MHz, and the NRZ coding IO scheme implemented for the pseudo channel based memory system. In some examples, the memory control device determining whether to implement low latency memory access commands in block 902 may include a pseudo channel controller (e.g., pseudo channel controller 316 in FIGS. 3A-4C).

In response to determining to implement low latency memory access commands (i.e., determination block 902="Yes"), the memory control device may implement the method 500, for example, starting at operations in any of blocks 502, 504, 506, described herein with reference to FIG. 5 or the method 600, for example, starting at operations in any of block 602, 604, described herein with reference to FIG. 6. In response to determining not to implement low latency memory access commands (i.e., determination block 902="No"), the memory control device may implement the operations in block 512 of the method 500 described herein with reference to FIG. 5.

Figure 10A:
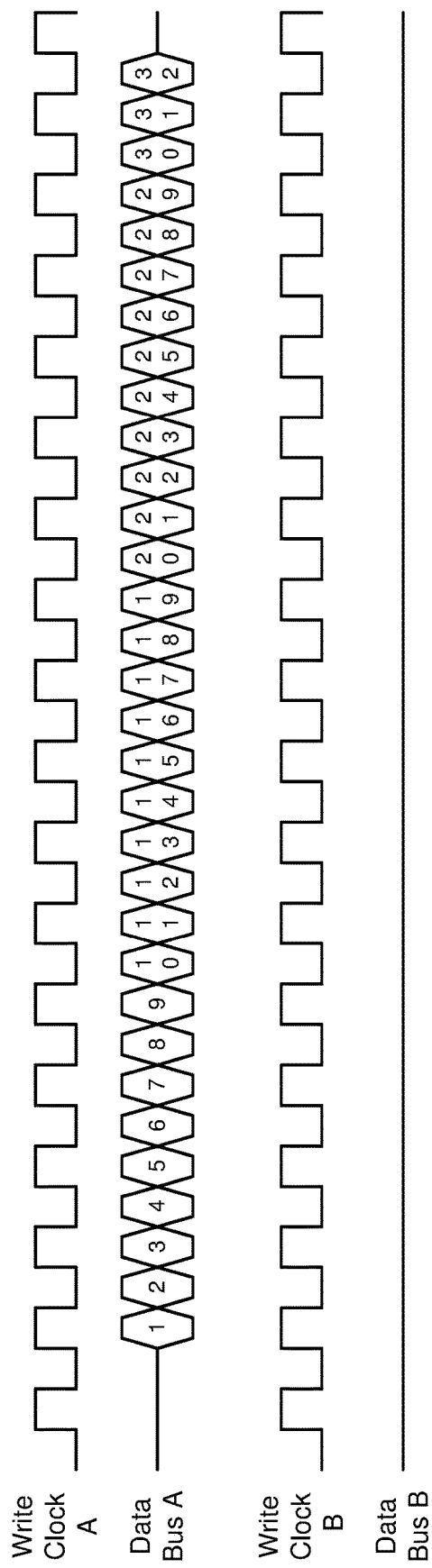
FIGS. 10A and 10B are timing diagrams illustrating examples of memory access commands with and without reducing latency in pseudo channel based memory systems according to an embodiment.
Figure 10B:
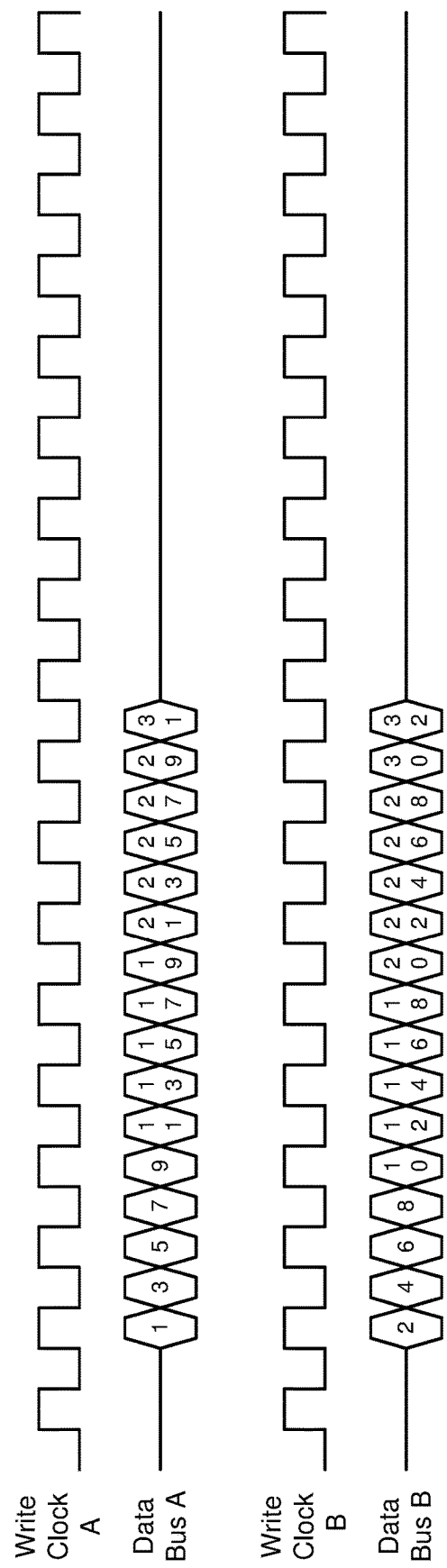
Figure 11A:
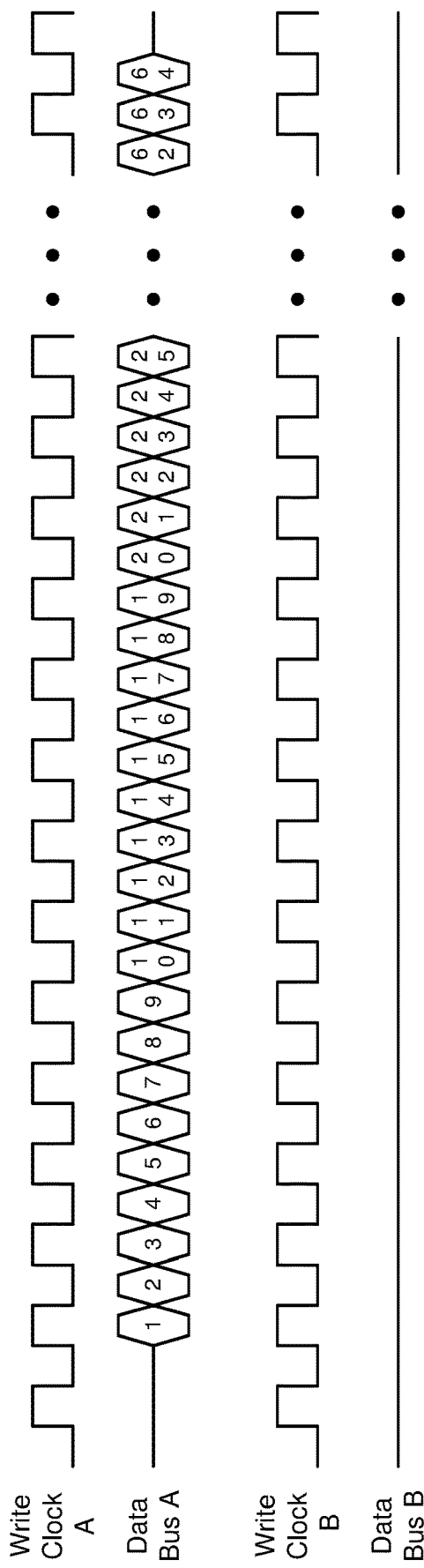
FIGS. 11A and 11B are timing diagrams illustrating examples of memory access commands with and without reducing latency in pseudo channel based memory systems according to an embodiment.
Figure 11B:
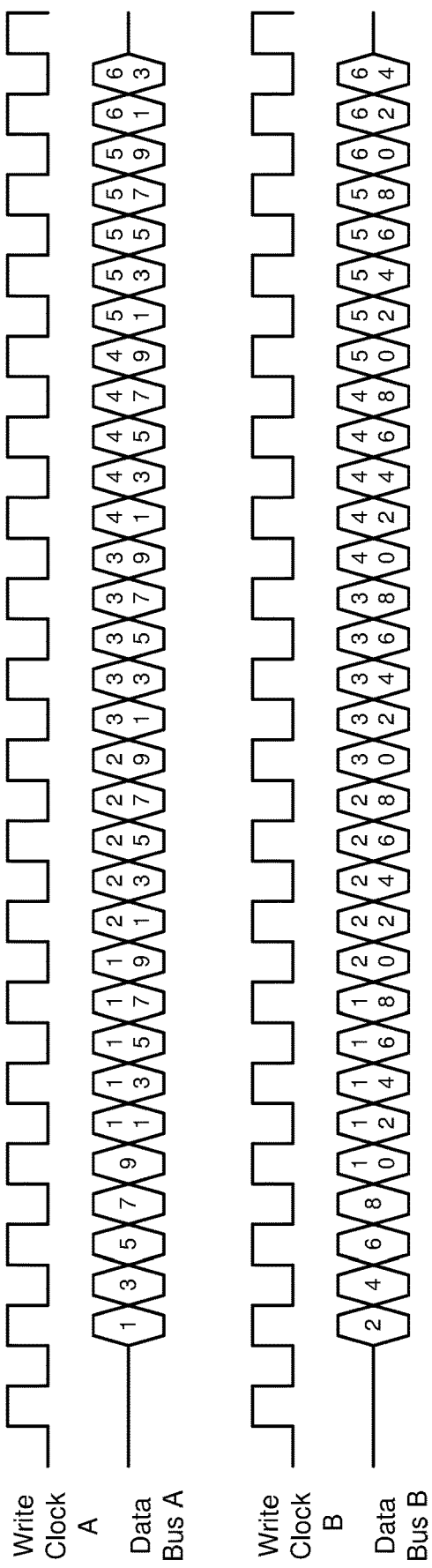

FIGS. 10A, 10B, 11A, and 11B illustrate examples of timing diagrams of memory access commands with and without reducing latency in pseudo channel based memory systems (e.g., memory 106, memory 114 in FIG. 1, DDR 200 in FIG. 2, DDR 300a, 300b in FIGS. 3A-4C) according to some embodiments. With reference to FIGS. 1-11B, a DDR (e.g., DDR 200 in FIG. 2, DDR 300a, 300b in FIGS. 3A-4C), operating in a second operation mode, may conventionally implement a standard or non-low latency type memory access command as illustrated in FIGS. 10A and 11A and the DDR, operating in a first operation mode, may implement a low latency type memory access command as illustrated in FIGS. 10B and 11B. The DDR may include multiple pseudo channel data buses (e.g., data bus 204a, 204b in FIG. 2, pseudo channel data bus 312a, 312b in FIGS. 3A-4C) ("data bus A", "data bus B"). The pseudo channel data buses may have a certain bit width. For example, the bit width of the pseudo channel data buses may be 16 bits.

For a conventional implementation of a standard or non-low latency type memory access command, the DDR may transmit or receive data on a single, dedicated pseudo channel data bus, e.g., data bus A, requiring a certain burst length. In the example illustrated in FIG. 10A, the burst length is 32 bytes. In the example illustrated in FIG. 11A, the burst length is 64 bytes. For implementation of a low latency type memory access command, the DDR may transmit or receive data on multiple pseudo channel data buses concurrently, e.g., data bus A and data bus B. For example, the DDR may transmit or receive alternating number bytes of the data on the multiple pseudo channel data buses. In the example illustrated in FIGS. 10B and 11B, the DDR may transmit or receive odd number bytes of the data on data bus A and even number bytes of the data on data bus B. As another example (not shown), the DDR may transmit or receive even number bytes of the data on data bus A and odd number bytes of the data on data bus B. Pairs of odd and even bytes transmitted or received on the data buses A and B may be words of data having high bytes and low bytes. High bytes may be transmitted or received on one of the data buses A or B and the low bytes may be transmitted or received on the other one of the data buses A or B. For example, the high bytes may be transmitted or received on the data bus A or B dedicated to a target pseudo channel (e.g., pseudo channel 220a, 220b in FIGS. 3A-4C) of a low latency type memory access command, and the low bytes may be transmitted or received on the other data bus A or B. Transmitting or receiving data on multiple pseudo channel data buses enables reducing the burst length compared to the conventional implementation of a standard or non-low latency type memory access command. For example, the burst length of the conventional implementation of a standard or non-low latency type memory access command may be divided by the number of pseudo channel data buses used to transmit or receive the data. In the example illustrated in FIG. 10B, the burst length is 16 bytes, compared to 32 bytes in the example illustrated in FIG. 10A. In the example illustrated in FIG. 11B, the burst length is 32 bytes, compared to 64 bytes in the example illustrated in FIG. 11A. Reducing the burst length may also reduce the number of clock cycles for completing the low latency memory access command compared to the standard or latency memory access command.

Figure 12:
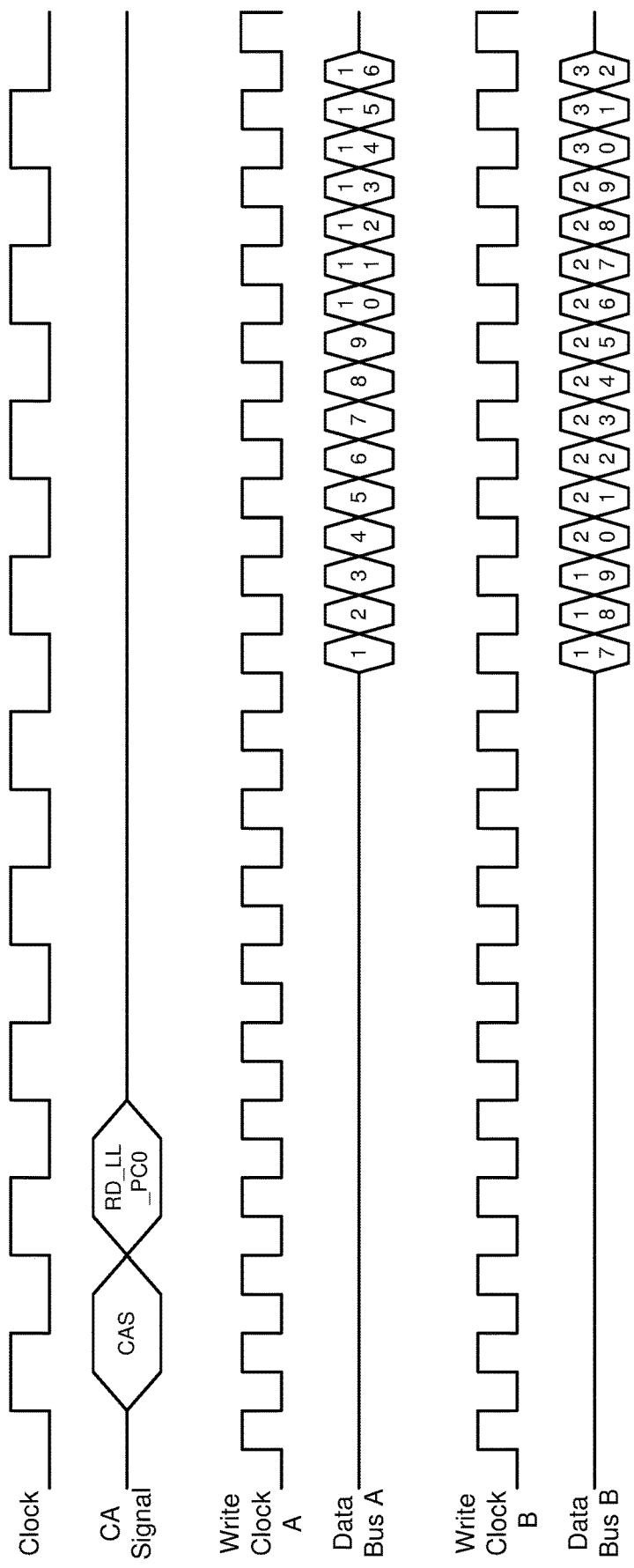
FIG. 12 is a timing diagram illustrating an example of reducing latency in pseudo channel based memory systems using a low latency type memory access command according to an embodiment.

FIG. 12 illustrates an example timing diagram reducing latency in pseudo channel based memory systems (e.g., memory 106, memory 114 in FIG. 1, DDR 200 in FIG. 2, DDR 300a, 300b in FIGS. 3A-4C) using a low latency type memory access command according to some embodiments. With reference to FIGS. 1-12, a DDR (e.g., DDR 200 in FIG. 2, DDR 300a, 300b in FIGS. 3A-4C), operating in a first operation mode, may implement a low latency type read memory access. The DDR may receive signals for implementing the low latency type read memory access, e.g., a column address strobe ("CAS") and low latency type read memory access for a pseudo channel (e.g., pseudo channel 220a, 220b in FIGS. 3A-4C) ("RD_LL_PC0"). The DDR may output data from the target pseudo channel on multiple pseudo channel data buses (e.g., data bus 204a, 204b in FIG. 2, pseudo channel data bus 312a, 312b in FIGS. 3A-4C), data bus A and data bus B, in response to the signals for implementing the low latency type read memory access.

Figure 13A:
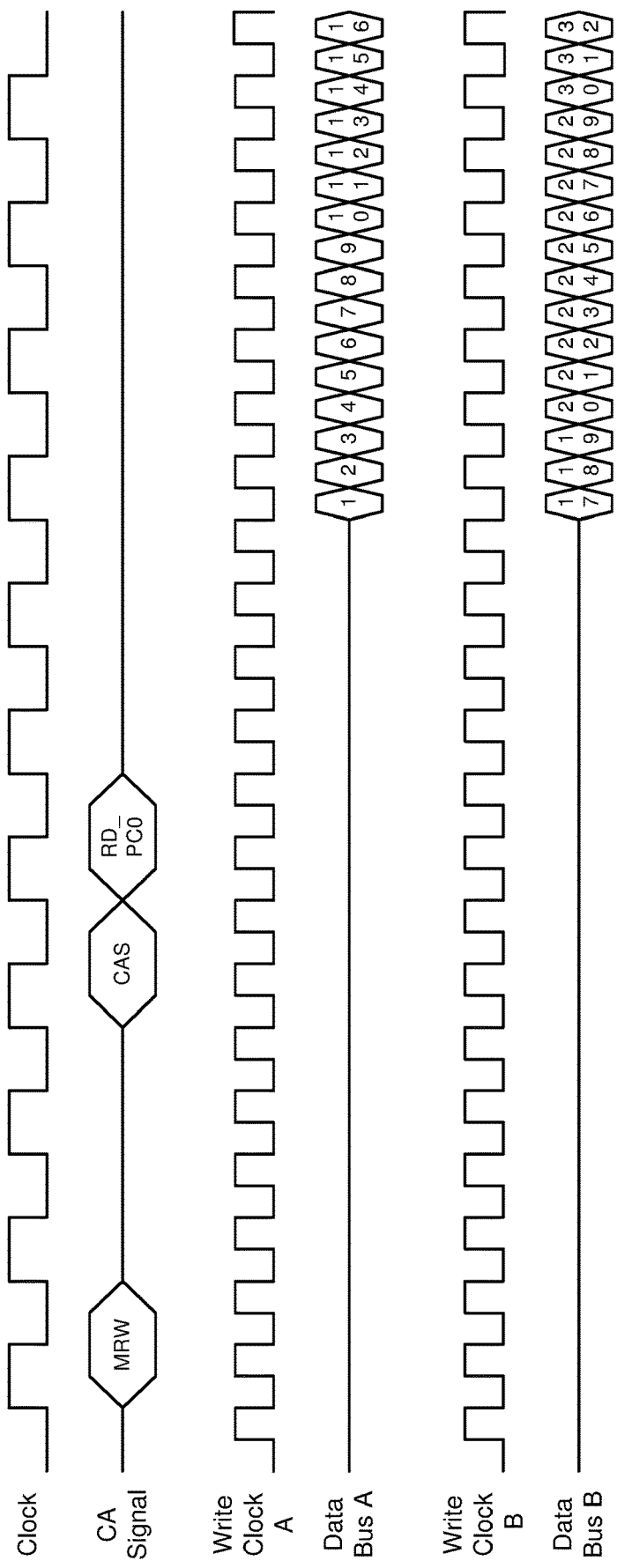
FIGS. 13A and 13B are timing diagrams illustrating examples of reducing latency in pseudo channel based memory systems using a mode register write to enable low latency type memory access command according to an embodiment.
Figure 13B:
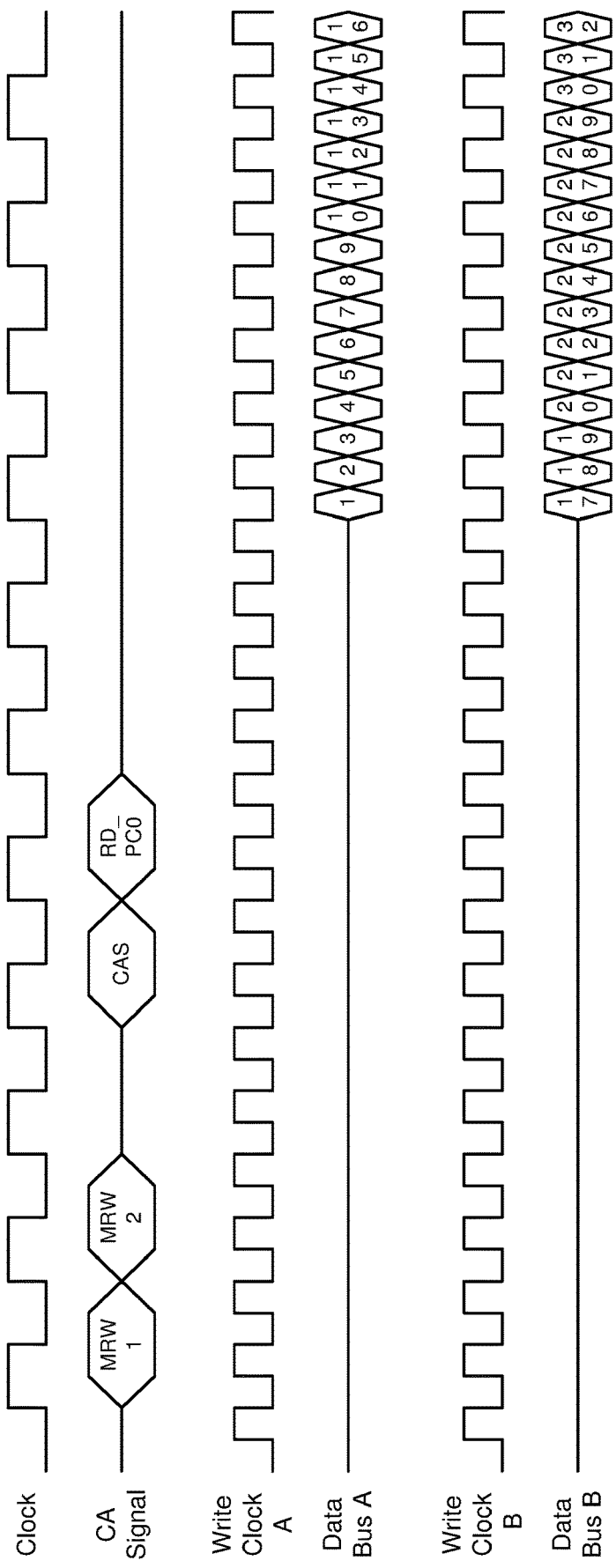

FIGS. 13A and 13B are timing diagrams illustrating examples of reducing latency in pseudo channel based memory systems (e.g., memory 106, memory 114 in FIG. 1, DDR 200 in FIG. 2, DDR 300a, 300b in FIGS. 3A-4C) using a mode register write to enable low latency type memory access command according to an embodiment. With reference to FIGS. 1-13B, a DDR (e.g., DDR 200 in FIG. 2, DDR 300a, 300b in FIGS. 3A-4C), operating in a first operation mode, may implement a low latency type read memory access following a mode register write enabling low latency type memory access commands. The DDR may receive signal(s) for the mode register write ("MRW" in FIG. 13A, "MRW1" and "MRW2" in FIG. 13B) prompting the DDR to implement successive memory access commands as low latency type memory access commands. The signal(s) for the mode register write may include a register address in the DDR and data for writing to the register. For example with reference to FIG. 13B, MRW1 and MRW2 together may form a single mode register write. MRW1 may include the register address in the DDR, and MRW2 may include the data for writing to the register. The DDR may receive signals for implementing a read memory access, e.g., a column address strobe ("CAS") and standard or non-low latency read memory access for a pseudo channel (e.g., pseudo channel 220a, 220b in FIGS. 3A-4C) ("RD_PC0"). The DDR may implement the read memory access as a low latency type read memory access and output data from the target pseudo channel on multiple pseudo channel data buses (e.g., data bus 204a, 204b in FIG. 2, pseudo channel data bus 312a, 312b in FIGS. 3A-4C), data bus A and data bus B, in response to the signals for the mode register write and implementing the read memory access.

Figure 14A:
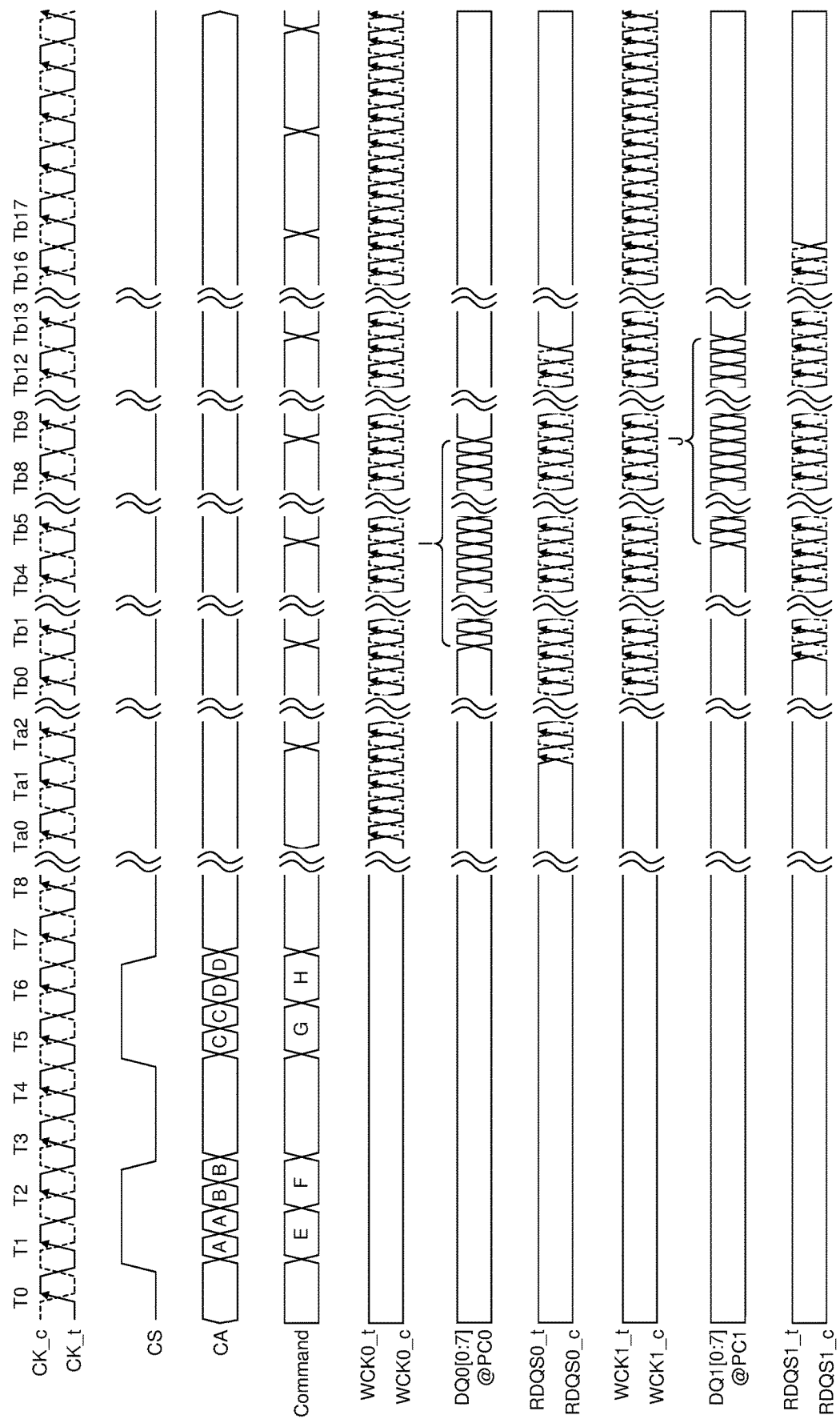
FIGS. 14A and 14B are timing diagrams illustrating examples of memory access commands with and without reducing latency in pseudo channel based memory systems according to an embodiment.
Figure 14B:
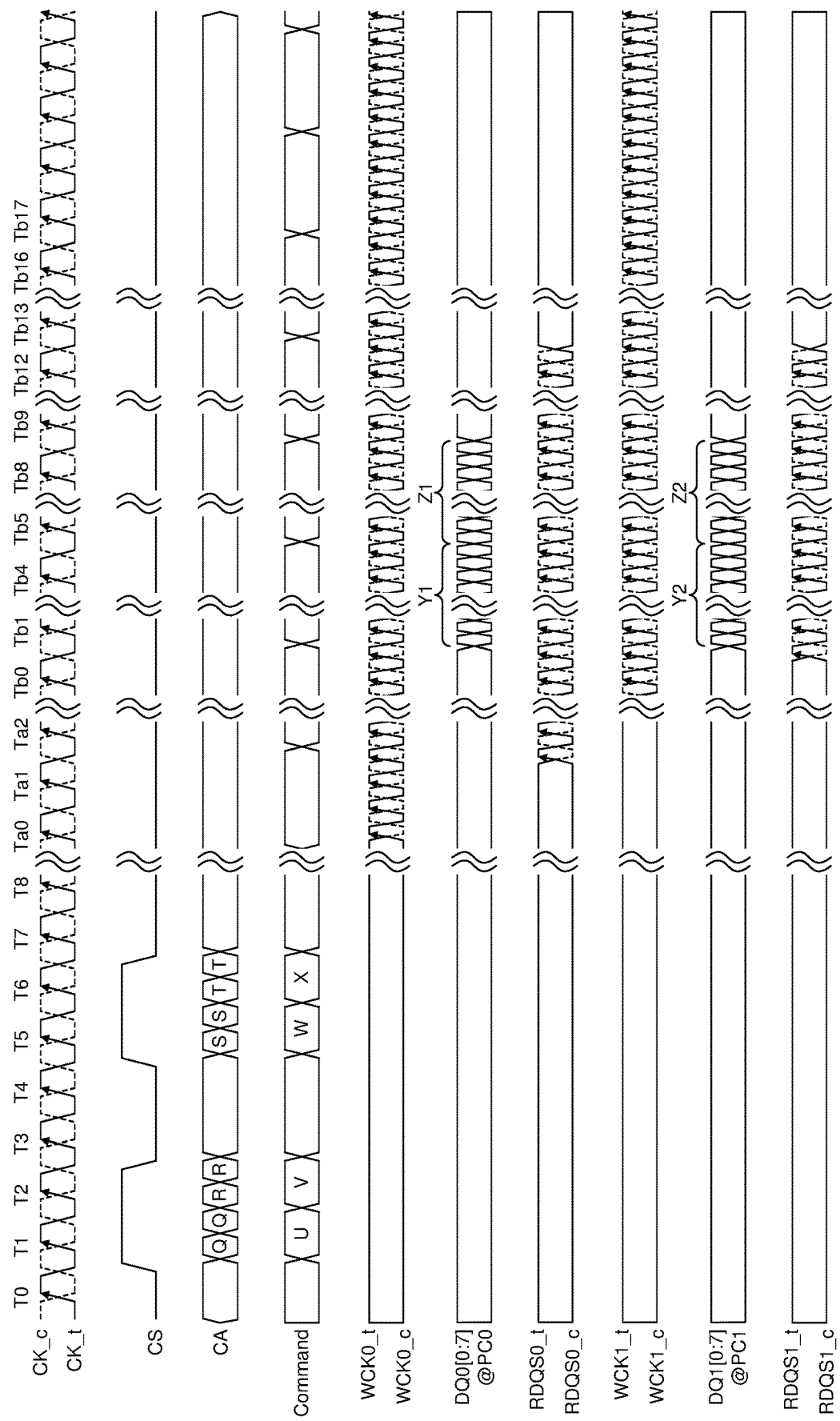

FIGS. 14A and 14B are timing diagrams illustrating examples of memory access commands with and without reducing latency in pseudo channel based memory systems (e.g., memory 106, memory 114 in FIG. 1, DDR 200 in FIG. 2, DDR 300a, 300b in FIGS. 3A-4C) according to an embodiment. With reference to FIGS. 1-14B, a DDR (e.g., DDR 200 in FIG. 2, DDR 300a, 300b in FIGS. 3A-4C), operating in a second operation mode, may conventionally implement a standard or non-low latency type memory access command as illustrated in FIG. 14A and the DDR, operating in a first operation mode, may implement a low latency type memory access command as illustrated in FIG. 14B. The DDR may include multiple pseudo channels (e.g., pseudo channel 220a, 220b in FIGS. 2-4C) ("PC0", "PC1") and pseudo channel data buses (e.g., data bus 204a, 204b in FIG. 2, pseudo channel data bus 312a, 312b in FIGS. 3A-4C) ("DQ0", "DQ1").

In the examples illustrated in FIGS. 14A and 14B a respective chip select (CS) signal may correspond to respective command and address (CA) validity signals (A, B, C, D in FIG. 14A and Q, R, S, T in FIG. 14B) and respective memory access command (Command) signals (E, F, G, H in FIG. 14A and U, V, W, X in FIG. 14B). Transmission of data signals (I, J in FIG. 14A and Y1, Y2, Z1, Z2 in FIG. 14B) may correspond to respective command signals. Pseudo channel-based memory systems may implement memory access commands in accordance with various clock cycles of various clocks, such as a system clock (CK_c, CK_t) and clocks for respective pseudo channels (PC0, PC1), such a write clock for PC0 (WCK0_c, WCK0_t) and a read clock for PC0 (RDQS0_t, RDQS0_c), and a write clock for PC1 (WCK1_c, WCK1_t) and a read clock for PC1 (RDQS1_t, RDQS1_c).

For the memory access command in the example illustrated in FIG. 14A, CA validity signals A may correspond with a first CAS signal E, CA validity signals B may correspond to a first standard or non-low latency type memory access command F; CA validity signals C may correspond to a second CAS signal G; and CA validity signals D may correspond to a second standard or non-low latency type memory access command H. For a conventional implementation of a standard or non-low latency type memory access command for a pseudo channel, the DDR may transmit or receive data on a single, dedicated pseudo channel data bus for each standard or non-low latency type memory access command, e.g., DQ0 for a read memory access of PC0 (F) and DQ1 for a read memory access of PC1 (H), requiring a certain burst length for each read memory access. In the example illustrated in FIG. 14A, the burst length is 32 bytes. Successive standard or non-low latency type memory access commands for different pseudo channels may be implemented concurrently but may not align to start and complete simultaneously, requiring more clock cycles than needed to complete a single standard or non-low latency type memory access command. For example, data signals (I) transmitted on DQ0 in response to the read memory access of PC0 (F) may not align with data signals (J) transmitted on DQ1 in response to the read memory access of PC1 (H).

For the memory access command in the example illustrated in FIG. 14B, CA validity signals Q may correspond to a first CAS signal U; CA validity signals R may correspond to a first low latency type memory access command V; CA validity signals S may correspond to a second CAS signal W; and CA validity signals T may correspond to a second low latency type memory access command X. For implementation of a low latency type memory access command (V, X) for a pseudo channel, the DDR may transmit or receive data on multiple pseudo channel data buses concurrently, such as DQ0 and DQ1 for a low latency type read memory access of PC0 (V) or PC1 (X). For example, the DDR may transmit or receive alternating number bytes of the data on the multiple pseudo channel data buses. In the example illustrated in FIG. 14B, the DDR may transmit or receive odd number bytes of the data on DQ0 and even number bytes of the data on DQ1 concurrently. Transmitting or receiving data on multiple pseudo channel data buses enables reducing the burst length compared to the conventional implementation of a standard or non-low latency type memory access command. For example, the burst length of the conventional implementation of a standard or non-low latency type memory access command may be divided by the number of pseudo channel data buses used to transmit or receive the data. In the example illustrated in FIG. 14B, the burst length is 16 bytes, compared to 32 bytes in the example illustrated in FIG. 14A. Successive low latency type memory access commands for different pseudo channels, such as PC0 and PC1, may be implemented successively, as shown in the command address (CA) line, and the reduced bust lengths may enable use of fewer clock cycles needed to complete a same number of standard or non-low latency type memory access commands. For example, data signals (Y1) may be transmitted on DQ0 concurrently with data signals (Y2) transmitted on DQ1 in response to the read memory access of PC0 (V), and data signals (Z1) may be transmitted on DQ0 concurrently with data signals (Z2) transmitted on DQ1 in response to the successive read memory access of PC1 (X).

Figure 15:
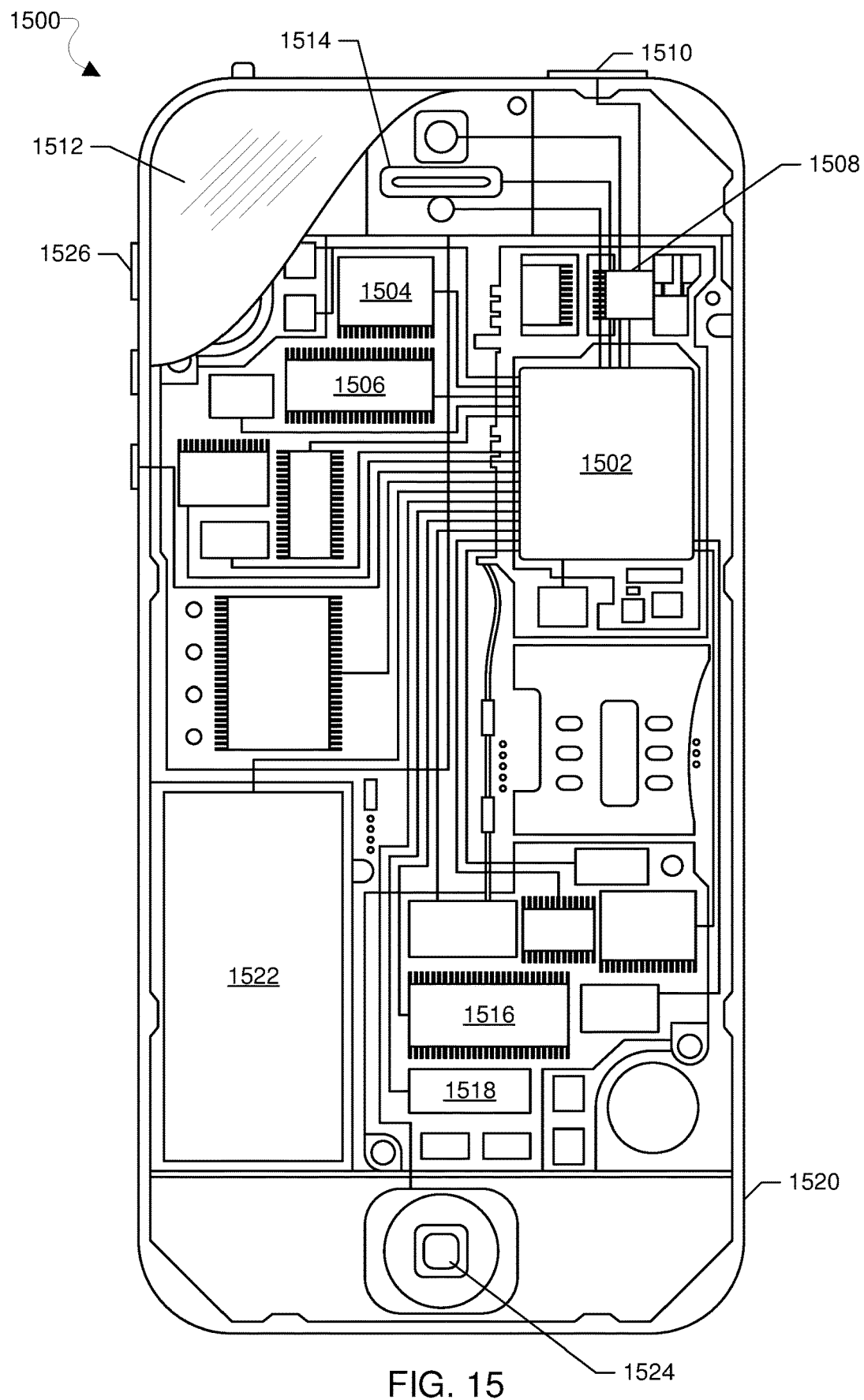
FIG. 15 is a component block diagram illustrating an example mobile computing device suitable for implementing various embodiments.

A system in accordance with the various embodiments (including, but not limited to, embodiments described above with reference to FIGS. 1-14B) may be implemented in a wide variety of computing systems including mobile computing devices, an example of which suitable for use with the various embodiments is illustrated in FIG. 15. The mobile computing device 1500 may include a processor 1502 coupled to a touchscreen controller 1504 and an internal memory 1506. The processor 1502 may be one or more multicore integrated circuits designated for general or specific processing tasks. The internal memory 1506 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1504 and the processor 1502 may also be coupled to a touchscreen panel 1512, such as a resistive-sensing touchscreen, capacitive-sensing touchscreen, infrared sensing touchscreen, etc. Additionally, the display of the mobile computing device 1500 need not have touch screen capability.

The mobile computing device 1500 may have one or more radio signal transceivers 1508 (e.g., Peanut, Bluetooth, ZigBee, Wi-Fi, RF radio) and antennae 1510, for sending and receiving communications, coupled to each other and/or to the processor 1502. The transceivers 1508 and antennae 1510 may be used with the above-mentioned circuitry to implement the various wireless transmission protocol stacks and interfaces. The mobile computing device 1500 may include a cellular network wireless modem chip 1516 that enables communication via a cellular network and is coupled to the processor.

The mobile computing device 1500 may include a peripheral device connection interface 1518 coupled to the processor 1502. The peripheral device connection interface 1518 may be singularly configured to accept one type of connection, or may be configured to accept various types of physical and communication connections, common or proprietary, such as Universal Serial Bus (USB), FireWire, Thunderbolt, or PCIe. The peripheral device connection interface 1518 may also be coupled to a similarly configured peripheral device connection port (not shown).

The mobile computing device 1500 may also include speakers 1514 for providing audio outputs. The mobile computing device 1500 may also include a housing 1520, constructed of a plastic, metal, or a combination of materials, for containing all or some of the components described herein. The mobile computing device 1500 may include a power source 1522 coupled to the processor 1502, such as a disposable or rechargeable battery. The rechargeable battery may also be coupled to the peripheral device connection port to receive a charging current from a source external to the mobile computing device 1500. The mobile computing device 1500 may also include a physical button 1524 for receiving user inputs. The mobile computing device 1500 may also include a power button 1526 for turning the mobile computing device 1500 on and off.

Figure 16:
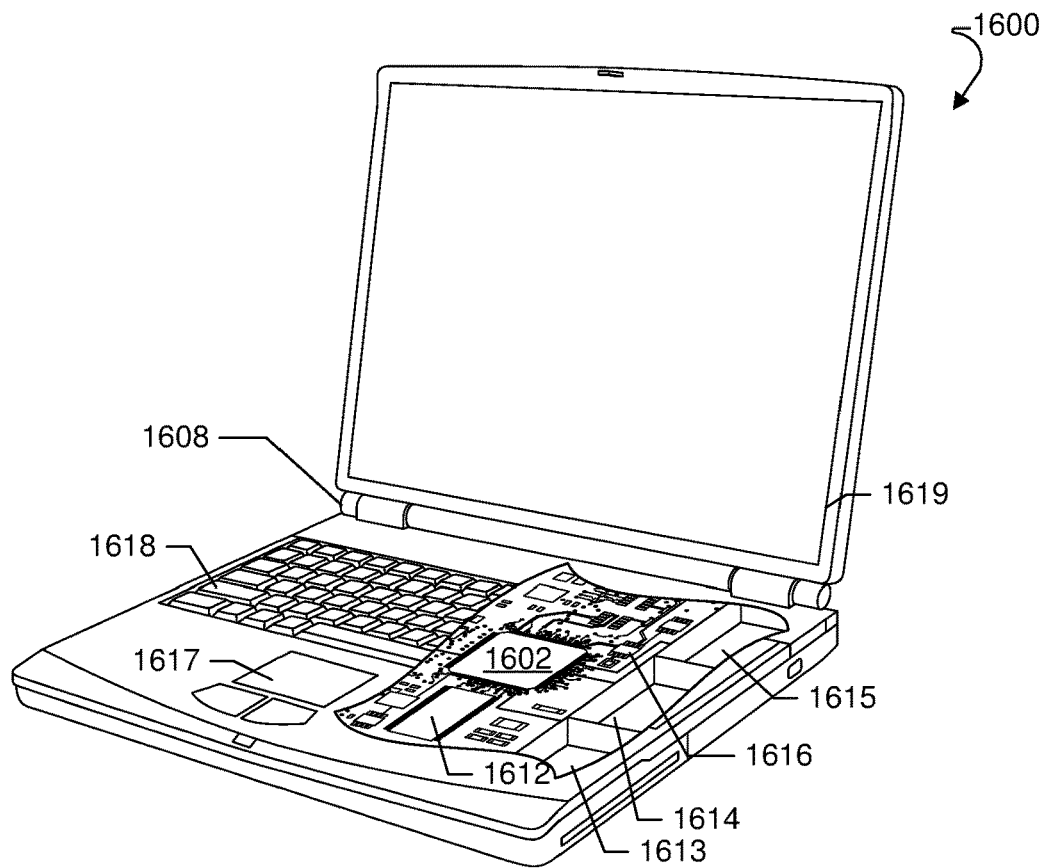
FIG. 16 is a component block diagram illustrating an example mobile computing device suitable for implementing various embodiments.

A system in accordance with the various embodiments (including, but not limited to, embodiments described above with reference to FIGS. 1-14B) may be implemented in a wide variety of computing systems include a laptop computer 1600 an example of which is illustrated in FIG. 16.

Many laptop computers include a touchpad touch surface 1617 that serves as the computer's pointing device, and thus may receive drag, scroll, and flick gestures similar to those implemented on computing devices equipped with a touch screen display and described above. A laptop computer 1600 will typically include a processor 1602 coupled to volatile memory 1612 and a large capacity nonvolatile memory, such as a disk drive 1613 of Flash memory. Additionally, the computer 1600 may have one or more antenna 1608 for sending and receiving electromagnetic radiation that may be connected to a wireless data link and/or cellular telephone transceiver 1616 coupled to the processor 1602. The computer 1600 may also include a floppy disc drive 1614 and a compact disc (CD) drive 1615 coupled to the processor 1602. In a notebook configuration, the computer housing includes the touchpad 1617, the keyboard 1618, and the display 1619 all coupled to the processor 1602. Other configurations of the computing device may include a computer mouse or trackball coupled to the processor (e.g., via a USB input) as are well known, which may also be used in conjunction with the various embodiments.

Figure 17:
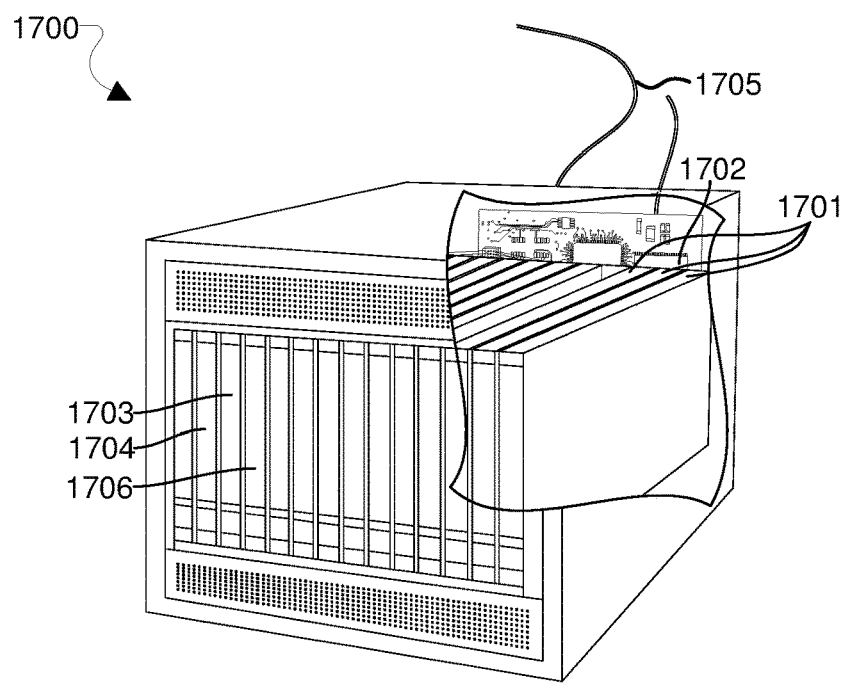
FIG. 17 is a component block diagram illustrating an example server suitable for implementing various embodiments.

A system in accordance with the various embodiments (including, but not limited to, embodiments described above with reference to FIGS. 1-14B) may also be implemented in fixed computing systems, such as any of a variety of commercially available servers. An example server 1700 is illustrated in FIG. 17. Such a server 1700 typically includes one or more multicore processor assemblies 1701 coupled to volatile memory 1702 and a large capacity nonvolatile memory, such as a disk drive 1704. As illustrated in FIG. 17, multicore processor assemblies 1701 may be added to the server 1700 by inserting them into the racks of the assembly. The server 1700 may also include a floppy disc drive, compact disc (CD) or digital versatile disc (DVD) disc drive 1706 coupled to the processor 1701. The server 1700 may also include network access ports 1703 coupled to the multicore processor assemblies 1701 for establishing network interface connections with a network 1705, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by a computing device comprising a processing device configured with processing device-executable instructions to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A pseudo channel based memory system, including a first pseudo channel selection device configured to selectively communicatively connect one of a plurality of pseudo channels to a first input/output (IO), and a second pseudo channel selection device configured to selectively communicatively connect one of the plurality of pseudo channels to a second IO, in which the first pseudo channel selection device and the second pseudo channel selection device are operable to communicatively connect a first pseudo channel of the plurality of pseudo channels to the first IO and to the second IO concurrently in a first operation mode.

Example 2. The pseudo channel based memory system of example 1, in which the first IO includes a first pseudo channel data bus and the second IO includes a second pseudo channel data bus, the pseudo channel based memory system further including a first internal data bus having a larger bit width than the first pseudo channel data bus and communicatively connected to the first pseudo channel, a second internal data bus having a same bit width as the first pseudo channel data bus and communicatively connected between a first portion of the first internal data bus and the first pseudo channel selection device, and a third internal data bus having a same bit width as the second pseudo channel data bus and communicatively connected between a second portion of the first internal data bus and the second pseudo channel selection device.

Example 3. The pseudo channel based memory system of example 2, in which the first internal data bus has a bit width equal to an integer multiple of the first pseudo channel data bus.

Example 4. The pseudo channel based memory system of any of examples 2 or 3, further including a fourth internal data bus having a larger bit width than the first pseudo channel data bus and communicatively connected to a second pseudo channel of the plurality of pseudo channels, a fifth internal data bus having a same bit width as the first pseudo channel data bus and communicatively connected between a first portion of the fourth internal data bus and the first pseudo channel selection device, and a sixth internal data bus having a same bit width as the second pseudo channel data bus and communicatively connected between a second portion of the fourth internal data bus and the second pseudo channel selection device.

Example 5. The pseudo channel based memory system of any of examples 1-4, in which the first pseudo channel selection device and the second pseudo channel selection device are operable to communicatively connect the first pseudo channel to the first IO and to the second IO concurrently in response to the pseudo channel based memory system receiving a low latency type memory access command targeting the first pseudo channel.

Example 6. The pseudo channel based memory system of example 5, further including a memory control device configured to receive the low latency type memory access command targeting the first pseudo channel, and transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the low latency type memory access command.

Example 7. The pseudo channel based memory system of any of examples 1-4, in which the first pseudo channel selection device and the second pseudo channel selection device are operable to communicatively connect the first pseudo channel to the first IO and to the second IO concurrently in response to the pseudo channel based memory system receiving a mode register write command configured to cause the pseudo channel based memory system to handle a successive memory access command as a low latency type memory access command and in response to the pseudo channel based memory system receiving a successive memory access command targeting the first pseudo channel.

Example 8. The pseudo channel based memory system of example 7, further including a memory control device configured to receive the mode register write command, set a register value configured to cause the memory control device to handle the successive memory access command as a low latency type memory access command in response to receiving the mode register write command, receive the successive memory access command targeting the first pseudo channel, and transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response receiving the successive memory access command.

Example 9. The pseudo channel based memory system of any of examples 1-8, in which the first pseudo channel selection device and the second pseudo channel selection device each include at least one multiplexer.

Example 10. The pseudo channel based memory system of any of examples 1-9, in which the first pseudo channel selection device is operable to communicatively connect the first pseudo channel to the first IO, and the second pseudo channel selection device is operable to communicatively connect a second pseudo channel of the plurality of pseudo channels to the second IO in a second operation mode.

Example 11. A method for reducing latency in a pseudo channel based memory system, including communicatively connecting a first pseudo channel of a plurality of pseudo channels to a first input/output (IO) of a plurality of IOs by a first pseudo channel selection device configured to selectively communicatively connect one of the plurality of pseudo channels to the first IO, and communicatively connecting the first pseudo channel to a second IO of the plurality of IOs by a second pseudo channel selection device concurrently with communicatively connecting the first pseudo channel to the first IO by the first pseudo channel selection device in a first operation mode, in which the second pseudo channel selection device is configured to selectively communicatively connect one of the plurality of pseudo channels to the second IO.

Example 12. The method of example 11, in which the first IO includes a first pseudo channel data bus and the second IO includes a second pseudo channel data bus, the method further including transmitting data between the first pseudo channel data bus and the first pseudo channel via a first internal data bus having a larger bit width than the first pseudo channel data bus and communicatively connected to the first pseudo channel, and a second internal data bus having a same bit width as the first pseudo channel data bus and communicatively connected between a first portion of the first internal data bus and the first pseudo channel selection device, and transmitting data between the second pseudo channel data bus and the first pseudo channel via the first internal data bus and a third internal data bus having a same bit width as the second pseudo channel data bus and communicatively connected between a second portion of the first internal data bus and the second pseudo channel selection device.

Example 13. The method of example 12, in which the first internal data bus has a bit width equal to an integer multiple of the first pseudo channel data bus.

Example 14. The method of any of examples 12 or 13, further including transmitting data between the first pseudo channel data bus and a second pseudo channel of the plurality of pseudo channels via a fourth internal data bus having a larger bit width than the first pseudo channel data bus and communicatively connected to the second pseudo channel, and a fifth internal data bus having a same bit width as the first pseudo channel data bus and communicatively connected between a first portion of the fourth internal data bus and the first pseudo channel selection device, and transmitting data between the second pseudo channel data bus and the second pseudo channel via the fourth internal data bus and a sixth internal data bus having a same bit width as the second pseudo channel data bus and communicatively connected between a second portion of the fourth internal data bus and the second pseudo channel selection device.

Example 15. The method of any of examples 11-14, further including receiving a low latency type memory access command targeting the first pseudo channel, in which communicatively connecting the first pseudo channel to the second IO by the second pseudo channel selection device concurrently with communicatively connecting the first pseudo channel to the first IO by the first pseudo channel selection device occurs in response to receiving the low latency type memory access command.

Example 16. The method of example 15, further including transmitting at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the low latency type memory access command.

Example 17. The method of any of examples 11-14, further including receiving a mode register write command configured to cause the pseudo channel based memory system to handle a successive memory access command as a low latency type memory access command, and receiving a successive memory access command targeting the first pseudo channel, in which communicatively connecting the first pseudo channel to the second IO by the second pseudo channel selection device concurrently with communicatively connecting the first pseudo channel to the first IO by the first pseudo channel selection device occurs in response to receiving the mode register write command and in response to receiving the successive memory access command.

Example 18. The method of example 17, further including setting a register value configured to cause the pseudo channel based memory system to handle the successive memory access command as a low latency type memory access command in response to receiving the mode register write command, and transmitting at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response receiving the successive memory access command.

Example 19. The method of any of examples 11-18, in which the first pseudo channel selection device and the second pseudo channel selection device each include at least one multiplexer.

Example 20. The method of any of examples 11-19, further including communicatively connecting a second pseudo channel of the plurality of pseudo channels to the second IO of the plurality of IOs by the second pseudo channel selection device in a second operation mode.

Example 21. A pseudo channel based memory system, including a plurality of pseudo channels, including a first pseudo channel, in which the pseudo channel based memory system is configured to receive a memory access command targeting the first pseudo channel, and use a first pseudo channel data bus and a second pseudo channel data bus to implement the memory access command.

Example 22. The pseudo channel based memory system of example 21, in which the memory access command is a read memory access command, and the pseudo channel based memory system is configured such that using the first pseudo channel data bus and the second pseudo channel data bus to implement the memory access command includes outputting data from the first pseudo channel in response to the read memory access command via the first pseudo channel data bus and the second pseudo channel data bus concurrently.

Example 23. The pseudo channel based memory system of any of examples 21 or 22, in which the memory access command is a write memory access command, and the pseudo channel based memory system is configured such that using the first pseudo channel data bus and the second pseudo channel data bus to implement the memory access command includes receiving data of the write memory access command for the first pseudo channel via the first pseudo channel data bus and the second pseudo channel data bus concurrently.

Example 24. The pseudo channel based memory system of any of examples 21-23, in which the memory access command is configured to indicate to the pseudo channel based memory system that the memory access command is a low latency type memory access command.

Example 25. The pseudo channel based memory system of any of examples 21-23, in which the pseudo channel based memory system is further configured to receive a mode register write command configured to cause the pseudo channel based memory system to handle a successive memory access command as a low latency type memory access command, in which the memory access command targeting the first pseudo channel is a successive memory access command to the mode register write command.

Example 26. A method for reducing latency in a pseudo channel based memory system having a plurality of pseudo channels, including a first pseudo channel, the method including receiving a memory access command targeting the first pseudo channel, and using a first pseudo channel data bus and a second pseudo channel data bus to implement the memory access command.

Example 27. The method of example 26, in which the memory access command is a read memory access command, and using the first pseudo channel data bus and the second pseudo channel data bus to implement the memory access command includes outputting data from the first pseudo channel in response to the read memory access command via the first pseudo channel data bus and the second pseudo channel data bus concurrently.

Example 28. The method of any of examples 26 or 27, in which the memory access command is a write memory access command, and using the first pseudo channel data bus and the second pseudo channel data bus to implement the memory access command includes receiving data of the write memory access command for the first pseudo channel via the first pseudo channel data bus and the second pseudo channel data bus concurrently.

Example 29. The method of any of examples 26-28, in which the memory access command is configured to indicate to the pseudo channel based memory system that the memory access command is a low latency type memory access command.

Example 30. The method of any of examples 26-28, further including receiving a mode register write command configured to cause the pseudo channel based memory system to handle a successive memory access command as a low latency type memory access command, in which the memory access command targeting the first pseudo channel is a successive memory access command to the mode register write command.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A pseudo channel based memory system, comprising:
  a first pseudo channel selection device configured to selectively communicatively connect one of a plurality of pseudo channels to a first input/output (IO); and
  a second pseudo channel selection device configured to selectively communicatively connect one of the plurality of pseudo channels to a second IO,
  wherein the first pseudo channel selection device and the second pseudo channel selection device are operable to communicatively connect a first pseudo channel of the plurality of pseudo channels to the first IO and to the second IO concurrently in a first operation mode in response to the pseudo channel based memory system receiving a mode register write command configured to cause the pseudo channel based memory system to handle a successive memory access command as a low latency type memory access command and in response to the pseudo channel based memory system receiving a successive memory access command targeting the first pseudo channel.

2. The pseudo channel based memory system of claim 1, wherein the first IO includes a first pseudo channel data bus and the second IO includes a second pseudo channel data bus, the pseudo channel based memory system further comprising:
   a first internal data bus having a larger bit width than the first pseudo channel data bus and communicatively connected to the first pseudo channel;
   a second internal data bus having a same bit width as the first pseudo channel data bus and communicatively connected between a first portion of the first internal data bus and the first pseudo channel selection device; and
   a third internal data bus having a same bit width as the second pseudo channel data bus and communicatively connected between a second portion of the first internal data bus and the second pseudo channel selection device.

3. The pseudo channel based memory system of claim 2, wherein the first internal data bus has a bit width equal to an integer multiple of the first pseudo channel data bus.

4. The pseudo channel based memory system of claim 2, further comprising:
   a fourth internal data bus having a larger bit width than the first pseudo channel data bus and communicatively connected to a second pseudo channel of the plurality of pseudo channels;
   a fifth internal data bus having a same bit width as the first pseudo channel data bus and communicatively connected between a first portion of the fourth internal data bus and the first pseudo channel selection device; and
   a sixth internal data bus having a same bit width as the second pseudo channel data bus and communicatively connected between a second portion of the fourth internal data bus and the second pseudo channel selection device.

5. The pseudo channel based memory system of claim 1, wherein the first pseudo channel selection device and the second pseudo channel selection device are operable to communicatively connect the first pseudo channel to the first IO and to the second IO concurrently in response to the pseudo channel based memory system receiving a low latency type memory access command targeting the first pseudo channel.

6. The pseudo channel based memory system of claim 5, further comprising a memory control device configured to:
   receive the low latency type memory access command targeting the first pseudo channel; and
   transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the low latency type memory access command.

7. The pseudo channel based memory system of claim 1, further comprising a memory control device configured to:
   receive the mode register write command;
   set a register value configured to cause the memory control device to handle the successive memory access command as a low latency type memory access command in response to receiving the mode register write command;
   receive the successive memory access command targeting the first pseudo channel; and
   transmit at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the successive memory access command.

8. The pseudo channel based memory system of claim 1, wherein the first pseudo channel selection device and the second pseudo channel selection device each include at least one multiplexer.

9. The pseudo channel based memory system of claim 1, wherein the first pseudo channel selection device is operable to communicatively connect the first pseudo channel to the first IO, and the second pseudo channel selection device is operable to communicatively connect a second pseudo channel of the plurality of pseudo channels to the second IO in a second operation mode.

10. A method for reducing latency in a pseudo channel based memory system, comprising:
    receiving a mode register write command configured to cause the pseudo channel based memory system to handle a successive memory access command as a low latency type memory access command;
    receiving a successive memory access command targeting the first pseudo channel;
    communicatively connecting a first pseudo channel of a plurality of pseudo channels to a first input/output (IO) of a plurality of IOs by a first pseudo channel selection device configured to selectively communicatively connect one of the plurality of pseudo channels to the first IO; and
    communicatively connecting the first pseudo channel to a second IO of the plurality of IOs by a second pseudo channel selection device concurrently with communicatively connecting the first pseudo channel to the first IO by the first pseudo channel selection device in a first operation mode, wherein the second pseudo channel selection device is configured to selectively communicatively connect one of the plurality of pseudo channels to the second IO; wherein communicatively connecting the first pseudo channel to the second IO by the second pseudo channel selection device concurrently with communicatively connecting the first pseudo channel to the first IO by the first pseudo channel selection device occurs in response to receiving the mode register write command and in response to receiving the successive memory access command.

11. The method of claim 10, wherein the first IO includes a first pseudo channel data bus and the second IO includes a second pseudo channel data bus, the method further comprising:
    transmitting data between the first pseudo channel data bus and the first pseudo channel via a first internal data bus having a larger bit width than the first pseudo channel data bus and communicatively connected to the first pseudo channel, and a second internal data bus having a same bit width as the first pseudo channel data bus and communicatively connected between a first portion of the first internal data bus and the first pseudo channel selection device; and transmitting data between the second pseudo channel data bus and the first pseudo channel via the first internal data bus and a third internal data bus having a same bit width as the second pseudo channel data bus and communicatively connected between a second portion of the first internal data bus and the second pseudo channel selection device.

12. The method of claim 11, wherein the first internal data bus has a bit width equal to an integer multiple of the first pseudo channel data bus.

13. The method of claim 11, further comprising:
transmitting data between the first pseudo channel data bus and a second pseudo channel of the plurality of pseudo channels via a fourth internal data bus having a larger bit width than the first pseudo channel data bus and communicatively connected to the second pseudo channel, and a fifth internal data bus having a same bit width as the first pseudo channel data bus and communicatively connected between a first portion of the fourth internal data bus and the first pseudo channel selection device; and
transmitting data between the second pseudo channel data bus and the second pseudo channel via the fourth internal data bus and a sixth internal data bus having a same bit width as the second pseudo channel data bus and communicatively connected between a second portion of the fourth internal data bus and the second pseudo channel selection device.

14. The method of claim 10, further comprising receiving a low latency type memory access command targeting the first pseudo channel,
wherein communicatively connecting the first pseudo channel to the second IO by the second pseudo channel selection device concurrently with communicatively connecting the first pseudo channel to the first IO by the first pseudo channel selection device occurs in response to receiving the low latency type memory access command.

15. The method of claim 14, further comprising transmitting at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the low latency type memory access command.

16. The method of claim 10, further comprising:
setting a register value configured to cause the pseudo channel based memory system to handle the successive memory access command as a low latency type memory access command in response to receiving the mode register write command; and
transmitting at least one pseudo channel selection signal to the first pseudo channel selection device and to the second pseudo channel selection device to cause the first pseudo channel selection device and the second pseudo channel selection device to communicatively connect the first pseudo channel to the first IO and to the second IO concurrently in response to receiving the successive memory access command.

17. The method of claim 10, wherein the first pseudo channel selection device and the second pseudo channel selection device each include at least one multiplexer.

18. The method of claim 10, further comprising communicatively connecting a second pseudo channel of the plurality of pseudo channels to the second IO of the plurality of IOs by the second pseudo channel selection device in a second operation mode.

19. A pseudo channel based memory system, comprising a plurality of pseudo channels, including a first pseudo channel,
wherein the pseudo channel based memory system is configured to:
receive a memory access command targeting the first pseudo channel;
use a first pseudo channel data bus and a second pseudo channel data bus concurrently to implement the memory access command; and
receive a mode register write command configured to cause the pseudo channel based memory system to handle a successive memory access command as a low latency type memory access command, wherein the memory access command targeting the first pseudo channel is a successive memory access command to the mode register write command.

20. The pseudo channel based memory system of claim 19, wherein:
the memory access command is a read memory access command; and
the pseudo channel based memory system is configured such that using the first pseudo channel data bus and the second pseudo channel data bus to implement the memory access command includes outputting data from the first pseudo channel in response to the read memory access command via the first pseudo channel data bus and the second pseudo channel data bus concurrently.

21. The pseudo channel based memory system of claim 19, wherein:
the memory access command is a write memory access command; and
the pseudo channel based memory system is configured such that using the first pseudo channel data bus and the second pseudo channel data bus to implement the memory access command includes receiving data of the write memory access command for the first pseudo channel via the first pseudo channel data bus and the second pseudo channel data bus concurrently.

22. The pseudo channel based memory system of claim 19, wherein the memory access command is configured to indicate to the pseudo channel based memory system that the memory access command is a low latency type memory access command.

23. A method for reducing latency in a pseudo channel based memory system having a plurality of pseudo channels, including a first pseudo channel, the method comprising:
receiving a memory access command targeting the first pseudo channel;
using a first pseudo channel data bus and a second pseudo channel data bus concurrently to implement the memory access command; and
receiving a mode register write command configured to cause the pseudo channel based memory system to handle a successive memory access command as a low latency type memory access command, wherein the memory access command targeting the first pseudo channel is a successive memory access command to the mode register write command.

24. The method of claim 23, wherein:
the memory access command is a read memory access command; and using the first pseudo channel data bus and the second pseudo channel data bus to implement the memory access command includes outputting data from the first pseudo channel in response to the read memory access command via the first pseudo channel data bus and the second pseudo channel data bus concurrently.

25. The method of claim 23, wherein:

the memory access command is a write memory access command; and using the first pseudo channel data bus and the second pseudo channel data bus to implement the memory access command includes receiving data of the write memory access command for the first pseudo channel via the first pseudo channel data bus and the second pseudo channel data bus concurrently.

26. The method of claim 23, wherein the memory access command is configured to indicate to the pseudo channel based memory system that the memory access command is a low latency type memory access command.

* * * * *